United States Patent
Branda et al.

(10) Patent No.: US 10,054,835 B2
(45) Date of Patent: Aug. 21, 2018

(54) SWITCHING MATERIALS, AND COMPOSITIONS AND METHODS FOR MAKING SAME

(71) Applicant: SWITCH MATERIALS, INC., Burnaby (CA)

(72) Inventors: Neil Robin Branda, Burnaby (CA); Glen Ramsay Bremner, Burnaby (CA); Jeremy Graham Finden, Burnaby (CA); Simon James Gauthier, Burnaby (CA); Bronwyn Hilary Gillon, Burnaby (CA); Andrew Koutsandreas, Burnaby (CA); Veronica Elizabeth Marshman, Burnaby (CA); Matt Andrew Pilapil, Burnaby (CA); Jonathan Ross Sargent, Burnaby (CA); James Daniel Senior, Burnaby (CA); Karthik Vikram Siva Shanmugam, Burnaby (CA)

(73) Assignee: SWITCH MATERIALS, INC., Burnaby, British Columbia (CA)

( * ) Notice: Subject to any disclaimer, the term of this patent is extended or adjusted under 35 U.S.C. 154(b) by 775 days.

(21) Appl. No.: 14/391,491

(22) PCT Filed: Apr. 9, 2013

(86) PCT No.: PCT/CA2013/000339
§ 371 (c)(1),
(2) Date: Oct. 9, 2014

(87) PCT Pub. No.: WO2013/152425
PCT Pub. Date: Oct. 17, 2013

(65) Prior Publication Data
US 2015/0070743 A1 Mar. 12, 2015

Related U.S. Application Data

(63) Continuation of application No. PCT/CA2012/000910, filed on Sep. 28, 2012.

(60) Provisional application No. 61/706,001, filed on Sep. 26, 2012, provisional application No. 61/673,470, filed on Jul. 19, 2012, provisional application No. 61/621,736, filed on Apr. 9, 2012.

(51) Int. Cl.
| | |
|---|---|
| *G02F 1/03* | (2006.01) |
| *G02F 1/153* | (2006.01) |
| *G02F 1/15* | (2006.01) |
| *G02F 1/01* | (2006.01) |
| *G02B 1/04* | (2006.01) |
| *G02B 5/23* | (2006.01) |
| *G02F 1/00* | (2006.01) |

(52) U.S. Cl.
CPC ............. *G02F 1/153* (2013.01); *G02B 1/04* (2013.01); *G02B 5/23* (2013.01); *G02F 1/0063* (2013.01); *G02F 1/0126* (2013.01); *G02F 1/15* (2013.01); *G02F 2001/1519* (2013.01)

(58) Field of Classification Search
USPC .................................. 349/241, 275; 252/500
See application file for complete search history.

(56) References Cited

U.S. PATENT DOCUMENTS

| | | | |
|---|---|---|---|
| 6,045,951 A | 4/2000 | Wendsjö et al. | |
| 6,361,709 B1 | 3/2002 | Bauer et al. | |
| 7,777,050 B2 | 8/2010 | Wallace et al. | |
| 2006/0251988 A1 | 11/2006 | Iftime et al. | |
| 2007/0002522 A1* | 1/2007 | Takeda ................... | H01G 9/038 361/502 |
| 2010/0315693 A1* | 12/2010 | Lam ......................... | G02B 5/23 359/241 |
| 2013/0015693 A1 | 1/2013 | Tosco | |

FOREIGN PATENT DOCUMENTS

| | | |
|---|---|---|
| JP | 2011085887 | * 4/2010 |
| WO | WO 02/18132 | 3/2002 |
| WO | WO 2006/125317 | 11/2006 |
| WO | WO 2009/087575 | 7/2009 |
| WO | WO 2010/142019 | 12/2010 |
| WO | WO 2011/121078 | 10/2011 |
| WO | WO 2013/044371 | 4/2013 |

OTHER PUBLICATIONS

Houk et al., "Why δ-Valerolactone Polymerizes and γ-Butyrolactone Does Not", *J. Org. Chem.*, vol. 73, 2008, pp. 2674-2678.
International Search Report and Written Opinion from International Application No. PCT/CA2013/000339 dated Jul. 2, 2013.
Jeffsol Alkylene Carbonates Brochure, *Huntsman*, 2001.
Somani et al., "Electrochromic materials and devices: present and future", *Materials Chemistry and Physic*, vol. 77, 2002, pp. 117-133.
Wang et al., "Novel in situ crosslinking reaction of ethylene-vinyl alcohol copolymers by propylene carbonate", *Materials Letters*, vol. 60, 2006, pp. 509-513.
International Preliminary Report on Patentability for International Patent Application No. PCT/CA2013/000339 dated Oct. 14, 2014, 5 pages.

(Continued)

*Primary Examiner* — Monique Peets
(74) *Attorney, Agent, or Firm* — Merchant & Gould P.C.

(57) ABSTRACT

A switching material comprising one or more than one polymers and an electrolyte comprising a salt and a solvent portion comprising one or more solvents; and one or more compounds having electrochromic and photochromic properties dispersed homogeneously through the switching material; and wherein the switching material is transitionable from a light state to a dark state on exposure to UV light and from a dark state to a light state with application of an electric voltage.

20 Claims, 6 Drawing Sheets

(56) References Cited

OTHER PUBLICATIONS

First Office Action from corresponding Chinese Patent Application No. 201380030275.3, dated Jan. 17, 2017.

* cited by examiner

SWITCHING MATERIALS, AND COMPOSITIONS AND METHODS FOR MAKING SAME

RELATED APPLICATIONS

This application is a National Stage Application of PCT/CA2013/000339, filed Apr. 9, 2013, which claims the benefit of U.S. Provisional Application No. 61/621,736 filed Apr. 9, 2012; and which claims benefit of U.S. Provisional Application No. 61/673,470 filed Jul. 19, 2012; and which claims benefit of U.S. Provisional Application No. 61/706,001 filed Sep. 26, 2012; and which claims benefit of PCT Application PCT/CA2012/000910, filed Sep. 28, 2012, all of which are incorporated herein by reference in their entirety. To the extent appropriate, a claim of priority is made to each of the above disclosed applications.

FIELD

The present disclosure relates to a switching material having electrochromic and photochromic properties, the switching material comprising a polymer, an electrolyte and one or more switchable compounds. The present disclosure further relates to compositions and methods for producing such a switching material.

BACKGROUND

A variety of materials or systems with variable light transmitting qualities are known, including electrochromic materials, suspended particle displays or screens, electrochromic, photochromic and thermochromic materials, and those that are hybrid—having two or more of photo-, electro- or thermochromic qualities. The materials may vary from solid, liquid, gel or the like, the particular state and composition of the material may be dependent upon, or limited by, the needs of the particular system. For example, the material may need to be conductive or insulative, may need to solubilize all components or only selected components of the system, and may further need to be tolerant of chemical transitions occurring with the material to achieve the light transmitting qualities. The chemical, electrochemical or molecular environments that may be suitable may vary greatly with the specific needs of the system.

Polymers may be used in such materials to provide structure or support, modulate rheology to aid in handling or manufacture, or to render the material in a suitable shape (e.g. be cast, extruded, coated or molded). Selection of the polymer(s) may be dependent on the intended use of the material, or in view of particular desired characteristics (e.g. photochemically inert, sufficiently high, or low, glass transition temperature, or the like.

The flowability of some polymer-containing systems may be modified by heat. While this may be advantageous for some manufacturing processes (e.g. injection molding, casting or the like), if the molded or cast material is subjected to temperature variations when in use, this characteristic may be undesirable in the final product.

A material that does not flow or alter shape with heat may be useful for some applications—resistance to flow may be imparted to a material by increasing the viscosity of the material, or solidifying the matrix, e.g. by crosslinking of one or more polymer species within the material. A variety of methods are generally known for creating intermolecular cross-linkages of polymers. Selection of a method, and/or particular reactants, may be dependent on an intended use or function, or desired characteristics of the composition or material comprising the cross-linked polymer, function of other components in the composition or the like. For example, some methods may include a condensation reaction, which may produce water, an alcohol group, an amine group or the like. Depending on the uses, the presence of these groups may adversely affect the durability or performance of the composition, or the function of another component in the composition.

It may be advantageous to incorporate materials with variable light transmitting qualities into laminated glass ("safety glass"). Some of these materials may be degraded, or some aspect of performance reduced, when subjected to the temperature and pressure of conventional glass lamination.

SUMMARY

A composition with reduced, or absent, temperature-induced flow may be a useful addition to the art. Where the composition includes a crosslinkable polymer, the ability to cure at reduced temperature, or without generation of radicals, or release of species that may be detrimental to performance of the composition may be advantageous. A material supportive of both photo- and electrochemical reactions for reversible interconversion of a chromophore between a faded state and a dark state conformations may be a useful addition to the art.

In accordance with one aspect, there is provided a switching material comprising: one or more than one polymers; an electrolyte comprising a salt and a solvent portion comprising one or more solvents; and one or more compounds having electrochromic and photochromic properties. The one or more compounds may be dispersed homogeneously throughout the switching material. The one or more compounds may be dispersed homogeneously throughout the electrolyte. The switching material may be transitionable from a light state to a dark state on exposure to UV light. The switching material may be transitionable from a dark state to a light state with application of an electric voltage. The one or more than one polymers may be crosslinked with a crosslinking agent; the crosslinking reaction between the one or more than one polymers and the crosslinking agent may be facilitated by an accelerant. The crosslinking agent may comprise one or more epoxide groups, one or more aldehyde groups, and or one or more isocyanate groups.

At least one of the one or more than one polymers may be a polyol; the polyol may be a polyvinyl acetal. The polyol may be polyvinyl butyral (PVB). A PVB may have one or more of a MW of from about 170 to about 350 k, or any amount or range therebetween; a polyvinyl alcohol group content of from about 12 to about 21%, or any amount or range therebetween, or from about 12 to about 18%, or from about 12 to about 16%, or from 18% to about 21%; a polyvinyl acetate content of from about 0 to about 4%, or any amount or range therebetween, or from about 1 to about 4%, or from about 0.5 to about 2.5%.

The electrolyte may have a potential range of from about −1.0V to about +1.5 V compared to an Ag/AgCl reference electrode.

In some aspects, the switching material may comprise one or more of about 2 wt % to about 15 wt % polymer; about 0.1 wt % to about 5 wt % salt; about 50 wt % to about 90 wt % solvent portion; and about 2% to about 15 wt % of a compound having electrochromic and photochromic properties. The switching material may comprise about 70 wt % to about 90 wt % electrolyte. A solvent of the electrolyte may have one or more of a boiling point of about 150° C. or greater; a vapour pressure of about 0.001 mmHg or less at 20° C.; a Yellowness Index (YI) of about 6 or less; a flash point of about 80° C. or greater; and a melting point of about 40° C. or less. The solvent may, when combined with a chromophore, have a change in Yellowness Index of about 6 or less after 250 hours of weathering.

The solvent portion may comprise a first and a second solvent. The first and second solvents may be present in approximately a 1:1 ratio. A first solvent of the solvent portion may be present in about an equal amount to that of a second solvent. In another aspect, a first solvent may be present in from about a 2 fold to about a 1000 fold greater ratio, relative to a second solvent. In some embodiments the first and second solvents may be present in a ratio of from about 1:1 to about 1000:1, or any range therebetween. In some aspects a solvent portion may comprise 3 or more solvents. The one or more solvents and their relative quantities may be selected, alone or in combination with one or more salts, to solubilize switching material components, provide a suitable electrochemical environment to switch the switching material when a voltage is applied and/or provide a suitably photostable switching material.

In accordance with another aspect, there is provided a switchable film comprising a first and optionally a second substantially transparent substrate, a first and a second electrode disposed on the surface of at least one of the substrates; and a switching material disposed between the first and the optional second substrates and in contact with the first and the second electrodes.

In accordance with another aspect, there is provided a method of making a switchable film comprising preparing a switching material, applying a layer of the switching material onto a first substrate, applying a second substrate to the layer of the switching material and curing the layer of switching material.

In accordance with another aspect, there is provided a method of making a switchable laminated glass (heat-laminated) comprising preparing a switchable film, positioning the switchable film within a stack of components comprising at least one layer of a hot-melt adhesive contacting an outer surface of the switchable film, and heating the unlaminated stack to a temperature of from about 90° C. to about 140° C. for at least 30 minutes. The unlaminated stack may be subjected to at least a partial vacuum before the step of heating. The step of heating may further include application of pressure. The pressure may be from about 50 psi to about 90 psi. The hot melt adhesive is polyvinylbutyral, polyurethane or ethylvinyl acetate.

In accordance with another aspect, there is provided a method of making a switching material, comprising providing a first part comprising one or more than one polymers, salt, an optional compound having photochromic and electrochromic aspects, and a first portion of the solvent portion; providing a second part comprising an optional hardener, a crosslinking agent and a second portion of the solvent portion; providing a third part comprising an accelerant and an optional sacrificial solvent; combining the first part and the second part; and combining the third part with the combined first and second parts.

In accordance with another aspect, there is provided a method of making a switchable film comprising the steps of: providing a first part comprising one or more polymers, a salt, one or more compounds having photochromic and electrochromic properties, and a first portion of the solvent portion; providing a second part comprising a hardener, a cross-linking agent and a second portion of the solvent portion; providing a third part comprising a catalyst and an optional co-solvent; combining the first part and the second part; combining the third part with the combined first and second parts to provide a coatable composition; and applying the composition to a substrate. The step of applying the composition may be preceded by a step of partially curing the switching material. The second part may further comprise a second polymer.

In another aspect, there is provided a switching material comprising about 12 to about 15 wt % chromophore; about 65 to about 75 wt % solvent portion; about 1 wt % salt; about 10 to about 13 wt % polymer; about 0.21 to about 0.42 wt % crosslinker; and about 0.01 to about 0.02 wt % accelerant.

In another aspect, there is provided a switching material comprising: about 12 wt % chromophore; about 74 wt % solvent portion; about 1 wt % salt; about 12 wt % polymer; about 0.21% crosslinker; about 0.01 wt % accelerant.

In another aspect, there is provided a composition comprising: about 2 wt % to about 25 wt % polymer; about 0.1 wt % to about 5 wt % crosslinking agent; about 0.1 wt % to about 5 wt % salt; about 50 wt % to about 90 wt % solvent portion; and optionally about 2% to about 20 wt % of a compound having electrochromic and photochromic properties.

The one or more compounds having photochromic and electrochromic properties may be in a mobile phase of the switching material. The one or more compounds may be dispersed throughout the electrolyte or switching material. The one or more compounds may be covalently linked to a polymer.

The switching material, or a film or device comprising the switching material may be heat-laminatable. The switching material, or a film or device comprising the switching material, may have a haze of less than about 3% or less than about 2% or less than about 1.5%. The haze may be assessed before, or after heat-lamination.

The switching material may demonstrate less than 5%, less than 10%, less than 15% or less than 20% decrease in darkening performance after 500 hours, or after 1000 hours, or after 1500 hours, or after 2000 hours of weathering. The switching material may demonstrate less than 5%, less than 10%, less than 15% or less than 20% decrease in darkening performance after 1 MJ/m$^2$, or after 2 MJ/m$^2$, or after 3 MJ/m$^2$, or after 4 MJ/m$^2$, or after 5 MJ/m$^2$, or after 6 MJ/m2 of weathering.

This summary does not necessarily describe all features. Other aspects, features and advantages will become apparent to those of ordinary skill in the art upon review of the following description of specific embodiments.

BRIEF DESCRIPTION OF THE DRAWINGS

These and other features will become more apparent from the following description in which reference is made to the appended drawings wherein.

DESCRIPTION

Figure 1:
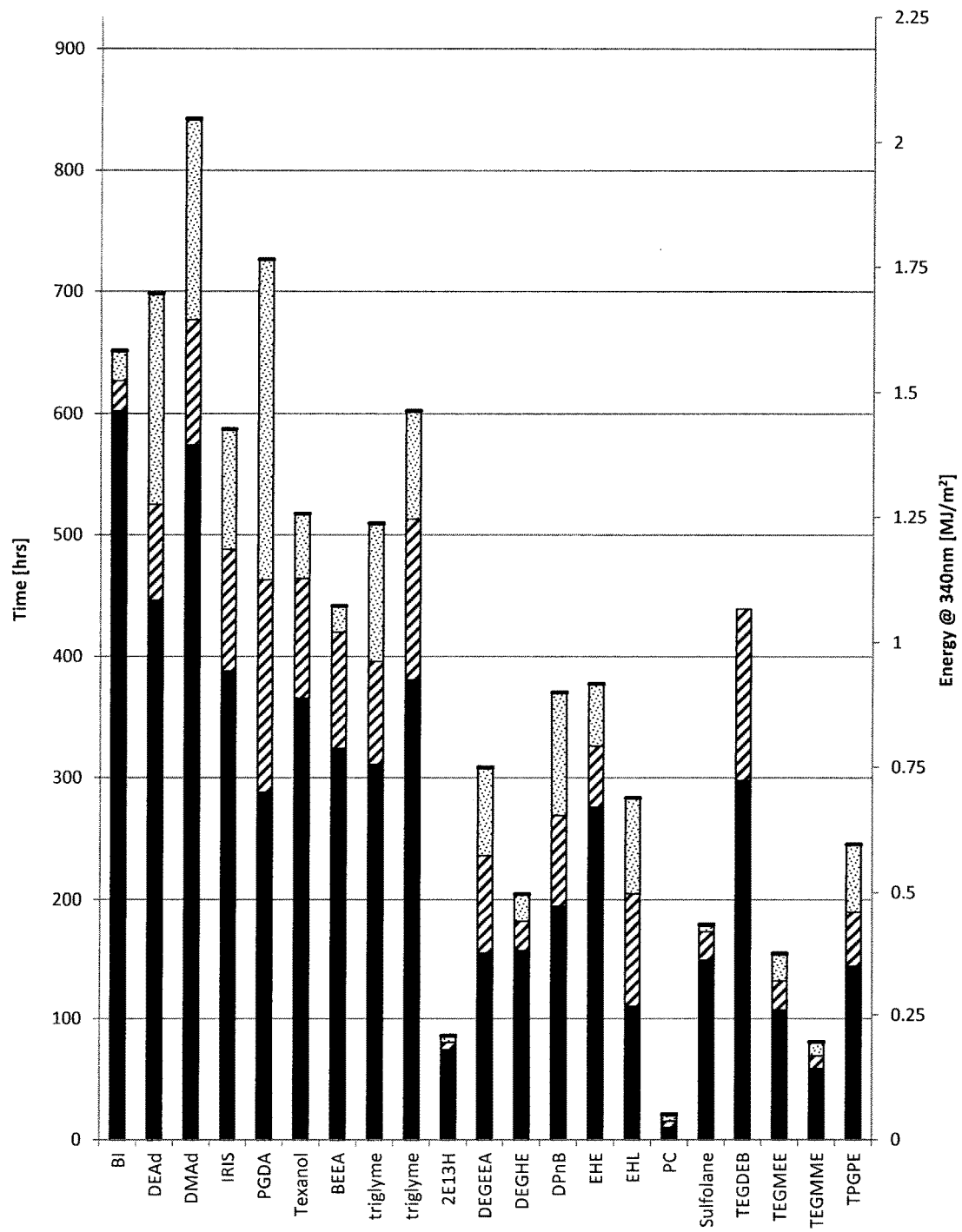
FIG. 1 shows a bar graph illustrating darkening performance of solvents demonstrating suitable cyclic voltammetry (CV) profiles. Experiments were performed in triplicate, and representative devices are shown. All samples are 5% S109 chromophore in the solvent, sealed in a sintered glass cell (SGC). Solvents are named along the X axis; time (hours) in a QSUN Xenon Test Chamber providing 0.68 W/m$^2$ of UV light at a wavelength of 340 nm is along the left side Y-axis; cumulative energy exposure (MJ/m$^2$) is along the right side Y-axis. Solid bar—90-100% of baseline dark state; striped bar—85-90% of baseline dark state; dotted bar 80-85% of baseline dark state. Solid black 'cap' at top of bar indicates device attained <80% of baseline dark state (removed from Xenon Test Chamber).

There is provided, in part, a switching material comprising a polymer, a salt and one or more compounds having electrochromic and photochromic properties.

Materials with controllable alteration of light transmission (switching, or switchable materials, compositions, formulations or the like) according to various embodiments, may be useful in devices or applications where an optical filter is desired. The compositions may be used as films or coatings that may be applied to a surface such as plastic, glass, a window, a lens or the like, and modify the light transmittance of the surface. Examples of such devices include optical filters, windows, films, opthalmic lenses, actinometers, molecular sensors, photochromic inks, paints or fibers, variable transmission filters, optical information storage systems, optoelectronic systems, reversible holographic systems, molecular switches such as those used in molecule-based wires and circuitry or the like.

In some embodiments, the switching material may be disposed upon a first substrate, or 'sandwiched' between a first substrate and a second substrate, the switching material capable of transitioning between a light state and a dark state based on application of light in the UV and/or VIS range, and application of an electric voltage. The substrate may be conductive, or comprise a conductive coating or surface that may contact the switching material. Switching material disposed upon a substrate and in contact with a conductive coating or surface, with or without a second substrate, may be generally referred to an optical filter. The switching material may be a liquid, a gel, a solid or a semi-solid, and may be formed in a layer (coating) with a thickness of about 0.1 micron (micrometer, vm) to about 100 microns, or any amount or range therebetween, for example from about 10 microns to about 50 microns, or from about 0.1 micron to about 10 microns, or from about 0.5 micron to about 5 microns, or any amount or range therebetween. In some embodiments, the layer of switching material may be of uniform, or substantially uniform thickness, or non-uniform thickness.

There is further provided, in part, a switchable film comprising a first, and optionally a second, substantially transparent substrate, a first and a second electrode disposed on the surface of at least one of the substrates, and a switching material disposed between the first and the second substrates and in contact with the first and the second electrodes. A switching material may comprise one or more polymers, a solvent portion comprising one or more solvents, a salt, and a compound having electrochromic and photochromic properties.

A switchable film, or optical filter or device comprising a switchable film, may have a switching time from a dark state to a faded state of from about 10 seconds to about 5 minutes, or any amount or range therebetween. Switching time may be altered by varying one or more of thickness of material (e.g. a layer or cast sheet of switching material), solvent proportion, chromophore proportion, degree of crosslinking of the polymer, proportion of polymer, composition of polymer, hardness of the cross-linked switching material, or the like. The switchable film may be optically clear.

There is further provided, in part, a composition comprising a polymer, a salt and optionally, one or more compounds having electrochromic and photochromic properties. The composition may be substantially non-flowing at a first temperature range (e.g. below about 25° C. to 30° C.). When heated to a second temperature range above the first temperature (e.g. from about 50° C. to about 80° C.), the composition may be of a coatable viscosity. A composition of a coatable viscosity may have sufficient surface tension or adhesion to be coatable in a layer of about 0.5 to about 4 mil on a moving web for roll-to-roll processing. The composition may be extrudable through a die onto a substrate, a moving web, or into a mold. The die may be a heated die, heated to about the second temperature range. Following coating, the composition cools to ambient temperature, or substantially ambient temperature. The composition may be thermally cross-linkable at a temperature above, or within the second temperature range (a curing temperature, or a curing temperature range).

There is further provided, in part, a composition comprising a polymer, a salt, a sacrificial solvent and optionally one or more compounds having electrochromic and photochromic properties. The composition comprising the sacrificial solvent is of a coatable viscosity within a first temperature range.

In some embodiments, the composition may comprise a polymer that is crosslinkable. The polymer may be a polyol. The composition, when crosslinked, may be referred to as a thermoset, thermoset composition, or thermosettable composition (if crosslinking has not been initiated, or is partial).

Generally (and without wishing to be bound by theory), a thermoset material may exhibit three phases in the curing process—viscous liquid, gel and solid, each with its own thermal mechanical properties. At a gel stage (gel point), covalent bonds connect across the material to provide a 3-dimensional network. At a gel state, the material may, if cut or strained, demonstrate stringiness or thinning of the web as it is stretched. As the thermoset material continues to cure, the cross-linking, if sufficiently dense, and allowed to continue to a 'solid' phase, may hinder molecular motion.

For switching materials according to various embodiments, the matrix of the cured material may be sufficiently open so as to permit movement of molecules within the matrix, allowing for the switch between open and closed ring isomers of hybrid photochromic/electrochromic (hybrid P/E) compounds within the material. A greater solvent portion than would conventionally be used to provide a free-standing film may be present.

There is further provided, in part, a method of making a switchable film comprising a switching material, comprising preparing a switching material comprising a polymer, a salt and one or more compounds having electrochromic and photochromic properties, coating a layer of the switching material onto a first substrate and laminating a second substrate to the layer of the composition. Where the composition further comprises a sacrificial solvent, the step of laminating the second substrate may be preceded by a step of removing the sacrificial solvent. The sacrificial solvent may be removed by vaporization—blown air, heat, a partial vacuum or a combination thereof. The step of coating may comprise a step of applying a layer of the composition onto the substrate; the substrate may be a moving web. The step of laminating may be followed by a step of curing the switchable material.

The terms lamination, to laminate, or the act of lamination refers generally to the manufacture of an apparatus or material in multiple layers, providing a composite with improved strength, stability or other properties. In some embodiments, the layers may be fixed by adhesive properties of an intermediate layer (e.g. a layer of switching material between first and second substrates). In some embodiments, a 'sandwich' of switching material between first and second substrates may be laminated between lites (panes) of glass (curved or flat) with one or more layers of a thermoplastic adhesive with the application of heat, or heat and pressure (e.g. in an autoclave or a press), or heat with reduced pressure (e.g. in a vacuum bag). Examples of thermoplastic adhesives include polyvinyl butyral, ethylvinyl acetate or polyurethane. Lamination involving the application of heat to melt an adhesive layer may be referred to as 'heat' lamination. Heat lamination may involve application of additional pressure, or reduced pressure. Heat lamination may be carried out at temperatures of from about 70° C. to about 150° C. or any amount or range therebetween, for time periods of from a few minutes (from about 10 to about 60 minutes) to a few hours. In some embodiments, heat lamination may be carried out at a temperature of at least about 90° C., or at least about 100° C., or at least about 110° C. or at least about 120° C. or at least about 130° C.

Switching material: A "switching material", as referenced herein, is a material that has both electrochromic and photochromic properties. A switching material may darken (e.g. reach a 'dark state') when exposed to ultraviolet (UV) light or blue light from a light source, and may lighten ("fade", achieve a 'light state') when exposed to an electric charge. Such a switching material may be alternately described as an auto-darkening material. In some embodiments, the switching material may fade upon exposure to selected wavelengths of visible (VIS) light ("photofade", "photobleach"), without sacrifice of the ability to be electrofaded when restored to a darkened state. In some embodiments, the switching material may darken when exposed to light comprising wavelengths from about 350 nm to about 475 nm, or any amount or range therebetween, and may lighten when a voltage is applied, or when exposed to light comprising wavelengths from about 500 to about 700 nm. The switching material may be optically clear.

The switching material may be a thermoplastic, thermosetting (uncured) or thermoset (cured) material. The switching material may be a viscoelastic material (an "elastomer"). Where the switching material is a thermoset material, it may be cured by heating, exposure to UV light, chemical reaction, irradiation, electron beam processing or a combination thereof.

Materials, compounds, compositions, formulations or the like, according to various embodiments may be described with reference to one or more properties, for example, photostationary state, photostability, visible light transmission (VLT), luminous transmittance ($LT_A$), contrast ratio, colour, solubility, electrochemical durability, thermal stability, switching voltage, switching time, manufacturability, switching kinetics, haze, operating temperature, manufacturing conditions or processes or the like. The one or more properties may be in reference to a compound, or in reference to a particular material, formulation, composition or component of a material, formulation or composition.

Components of a switching material, or a composition for making a switching material according to various embodiments include one or more of a crosslinkable polymer, a polymer, an salt, a cross-linker, a hardener, a hybrid P/E compound, an accelerant (catalyst), or a co-solvent.

Coatability refers to the ability to apply the composition on a moving web. Coordinating dynamic viscosity of the composition and rate of web travel is within the ability of one skilled in the art. Generally, a more viscous composition may be applied to a slower moving web, while a less viscous composition may be applied to a faster moving web. Thickness of the coating may also be coordinated by manipulation of composition viscosity and/or rate of web travel; a more viscous composition applied to a slower moving web may have a greater thickness than a less viscous composition applied to a slower moving web.

Viscosity may be manipulated by the proportion of one or more of the components of the coatable formulation, including cross-linkable polymer, rheology modifier, solvent, chromophore, and/or an optional sacrificial solvent. Viscosity of a coatable formulation may be manipulated by temperature; a reduction of temperature may increase viscosity, while an increase in temperature may decrease viscosity.

The level of crosslinking may be selected so as to be sufficiently high to provide a suitable viscosity of the composition at the desired temperature, but not so high as to form a gel matrix too solid to hinder molecular motion, and adversely affect fading kinetics. Degree of crosslinking may affect one or more of the pot life of the composition, cure rate or hardness of the resulting crosslinked polymer material, and/or switching kinetics of the crosslinked switching material. The specific concentration of cross-linking agent and polymer may vary with the nature of the crosslinking agent (two, three or more reactive groups), nature of the polymer (molecular weight, quantity of reactive —OH groups or the like), presence of formulation components that may compete with reactive —OH groups and/or reactive groups of the crosslinking agent, or the like.

When dissolved in the solvent phase, the ionic components of the salt separate, and will migrate to the electrodes to form an electrical double-layer at the electrode/electrolyte interface when electricity is applied. Separation of the ionic components is influenced, in part, on the electrochemical environment in the switching material, which is established, in part, by the solvent(s) and salt(s) present. A salt with a higher dissociation constant will generally separate more readily than one with a lower dissociation constant, and a solvent phase with a higher dielectric constant, or comprising components with high dielectric constants, may facilitate this dissociation. More efficient formation of the electrical double-layer may provide for faster electrochemical fading of a switching material.

Figure 2:
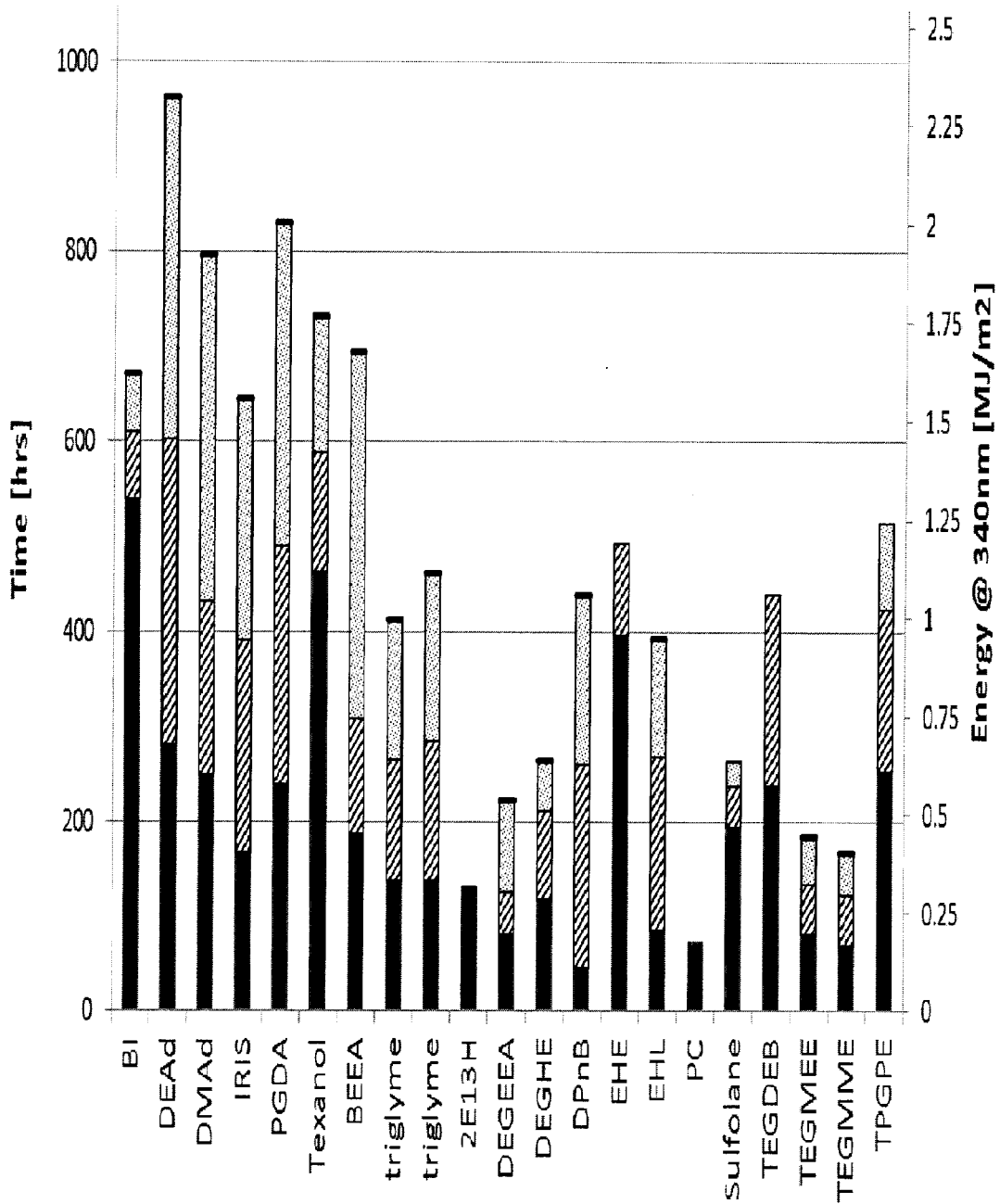
FIG. 2 shows a bar graph illustrating the change in Yellowness Index (delta YI, or ΔYI) for the same samples of FIG. 1. Solid bar—delta YI of 0-5 relative to baseline faded state; striped bar—delta YI of 5-10 relative to baseline faded state; dotted bar delta YI of 10-15 of baseline faded state. Solid black "cap" at top of bar indicates device with delta YI>15.

Photostability may also be affected by the components in a switching material. Individual components, alone or in combination, may have varying degrees of photostability (resistance to degradation—when exposed to light over prolonged periods of time). As some switching materials may be operated by exposure to UV light to darken, it may be advantageous so select switching material, or switching material components, that demonstrate better photostability. Further, some components may individually have suitable photostability when exposed to light, but the degradation becomes readily apparent when combined with one or more components. As an example, candidate solvents may be combined with chromophore, or chromophore and salt, and weathered. The samples may be assessed for photostability by periodic testing of the switching performance of the sample—darkening when exposed to UV light and fading when exposed to a portion of visible light (e.g. 500-700 nm, or light from a low pressure sodium lamp). FIGS. 1 and 2 illustrate the relative photostability of some solvent-chromophore samples with weathering; other switching material components may be individually or collectively screened in a similar manner.

A formulation may be selected depending on the performance criteria that may be desired—in some cases a formulation may be selected to achieve a balance between photostability and electrofading speed, for example, or may be selected to emphasize one over the other, depending on the intended use.

In some embodiments, a higher MW polymer may be useful, forming a smaller overall portion of the formulation (by wt). In some embodiments, a lower portion of crosslinking agent may provide for a less-crosslinked material; a less-crosslinked material may provide greater mobility in the electrolyte, and greater mobility of chromophores; greater mobility of switching material components (e.g. ions, chromophore) may provide for faster electrofading time. In some embodiments, increasing the solvent portion of a switching material may decrease fading time. In some embodiments, increasing a chromophore portion may increase contrast ratio between dark and faded states. In some embodiments, a BF4 anion as part of the electrolyte may improve photostability. In some embodiments, a TFSI anion as part of the electrolyte may decrease fading time. In some embodiments, increasing a crosslinker portion, polymer portion, or both a crosslinker portion and a polymer portion, may increase firmness of a switching material (e.g. cured as a film). In some embodiments increasing firmness of a switching material may reduce flow during cure. In some embodiments, an increase in the proportion of —OH groups on a polymer may increase the amount of crosslinking. In some embodiments, inclusion of a salt with a higher dissociation constant in the electrolyte (e.g. TFSI anion vs $BF_4$ anion) may decrease fading time. In some embodiments, increasing the permittivity of the solvent phase by inclusion of a solvent component with a higher dielectric constant may decrease fading time; the solvent component with a higher dielectric constant may have a dielectric constant of from about 5 to about 15 or greater, or any amount or range therebetween, or from about 5 or greater, or from about 10 or greater, or from about 15 or greater.

Polymer: A 'polymer' ("polymer resin", "resin") generally refers to a polymer or prepolymer, or mixture comprising a polymer or prepolymer, with reactive groups that may crosslink intramolecularly or intermolecularly. A switching material according may comprise one, or more than one polymers; the switching material may be thermoplastic, or thermoset, or a combination of the two (e.g. partially cured). A polymer may comprise a homopolymer or a copolymer; the copolymer may be a random, block, alternating, or periodic copolymer, or the like. A polymer may comprise a linear, branched, or dendrimeric polymer. A polymer may have any pendant group suitable for crosslinking; in some embodiments, the polymer is a polyol. Examples of polymers comprising pendant —OH groups (polyols) include ethylene vinyl alcohol copolymer, polyvinyl alcohol (PVOH, PVAl), polyvinyl acetals, glycerol propoxylate-block-ethoxylate, poly(ethylene oxide) (PEO), partially hydrolyzed ethylene vinyl acetate (EVA), some fluoropolymers (e.g. those described in WO2011/121078) or the like. The polymer, or polyol, may be soluble in a solvent portion of a switching material. Generally, a polyol combined with a crosslinking agent under suitable reaction conditions may crosslink two alcohol groups; crosslinking may be inter- or intra-molecular. A polymer comprising a higher proportion of —OH groups (e.g. % alcohol subunits) may exhibit a greater degree of cross-linking than a polymer having a lesser proportion of —OH content. A polymer of a higher molecular weight may be used in lesser proportion than a polymer of a lower molecular weight, to achieve a similar viscosity and/or thickness of switchable material. Thus, selection of a higher molecular weight polymer, which may be used in a lesser proportion than a polymer of similar composition (% —OH groups) in a switching material; use of a lesser proportion of polymer (and/or other component) may allow for a greater proportion of solvent or ionic medium, or other components, thereby providing a means for manipulation of switching speed, light transmission in faded or dark states, pot life, suitability for different coating, mixing, use or storage applications or the like. As an example, a greater proportion of solvent, or ionic species, or both, in the switching material, may increase switching speed.

Polyvinyl acetal may be produced by reacting polyvinyl alcohol and one or more aldehyde species, according to known methods. The polyvinyl alcohol may be of any suitable molecular weight range to provide the desired molecular weight range of the polyvinyl acetal polymer. The aldehyde used for the production of the polyvinyl acetal is not particularly limited, and may include formaldehyde (including paraformaldehyde), acetaldehyde (including paraacetaldehyde), propanal, propionaldehyde, butyraldehyde, n-octyl aldehyde, amyl aldehyde, hexyl aldehyde, heptyl aldehyde, 2-ethylhexyl aldehyde, cyclohexyl aldehyde, furfural, glyoxal, glutaraldehyde, benzaldehyde, 2-methylbenzaldehyde, 3-methylbenzaldehyde, 4-methylbenzaldehyde, p-hydroxybenzaldehyde, m-hydroxybenzaldehyde, phenylacetaldehyde, beta-phenylpropionaldehyde or the like. The aldehyde may be used singly, or two or more may be used in combination. In some embodiments, the aldehyde is butyraldehyde, and the polymer is polyvinyl butyral (PVB).

PVB is a random copolymer, and methods for preparation of PVB are known in the art. PVB may be described with reference to one or more of molecular weight (MW), percent alcohol groups (percent polyvinyl alcohol content), degree of acetalization (percent polyvinyl acetate content) or the like. Varying one or more of these provides for PVB with varying properties. Some PVBs may have a polyvinyl alcohol content of from about 5% to about 30%, or about 5, 6, 7, 8, 9, 10, 11, 12, 13, 14, 15, 16, 17, 18, 19, 20, 21, 22, 23, 24, 25, 26, 27, 28, 29 or 30%, or any amount or range therebetween. Some PVB may have a polyvinyl acetate content of from about 0.1% to about 10%, or about 0.5, 1, 1.5, 2, 2.5, 3, 3.5, 4, 4.5, 5, 5.5, 6, 6.5, 7, 7.5, 8, 8.5, 9, 9.5 or 10% or any amount or range therebetween.

Molecular weight (average) in g/mol of PVB may be determined by any of several methods known in the art, for example phase gradient polymer elution chromatography. Some PVB (before crosslinking) may have an average molecular weight from about 20000 g/mol (20K) to about 350000 g/mol (350K), or any amount or range therebetween, or about 30000 g/mol (30K), about 40000 g/mol (40K), about 50000 g/mol (50K), about 60000 g/mol (60K), about 70000 g/mol (70K), about 80000 g/mol (80K), about 90000 g/mol (90K), about 100000 g/mol (100K), about 125000 g/mol (125K), about 150000 g/mol (150K), about 175000 g/mol (175K), about 200000 g/mol (200K), about 225000 g/mol (225K), or about 250000 g/mol (250K), or about 300000 g/mol (300K), or about 325000 g/mol (325K), or any amount or range therebetween. One or more polymers, or one or more PVBs may be present in a composition or formulation, independently, in an amount of about 0.5 wt % to about 25 wt %, or any amount or range therebetween, for example 1, 2, 3, 4, 5, 6, 7, 8, 9, 10, 11, 12, 13, 14, 15, 16, 17, 18, 19, 20, 21, 22, 23 or 24 wt %. Some PVB resins may have an —OH group content of from about 18 to about 21%, and/or an acetal content of about 1-2%, and/or an MW of from about 50K to about 350K. Examples of PVB resins that may be used in compositions or formulations are set out in Table 1, below. In some embodiments two or more types of PVB may be combined in a film. Two or more polymers, including one or more types of PVB, to be combined may be selected for solubility in a solvent, or solvent mixture, or where their combination provides for an improved or unexpected property such as resistance to flow, improved switching speed (when combined in a switchable film), adhesion to substrate, retention of solvent or the like.

Cross-linker: in some embodiments, the one or more polymers, or one or more polyols may be crosslinked. A cross-linker (cross-linking agent) may comprise two or more reactive groups; reactive groups may independently be, for example, aldehyde, epoxide, isocyanate, silane or the like. A crosslinking agent may be soluble in a solvent portion of a switching material. Examples of crosslinking agents include aldehyde, isocyanate, melamines, phenolic resins or the like. A hardener may be used with some crosslinking agents. Examples of aldehyde crosslinkers include terephthalaldehyde and the like. Examples of epoxides include diglycidyl ethers of polypropylene glycol (e.g. DER736, DER732, both from Dow Chemical), bisphenol A diglycidyl ether (BADGE), 1,4-butanediol diglycidyl ether, 1,4-cyclohexanedimethanol diglycidyl ether, 1,2,5,6-diepoxycyclooctane, resorcinol diglycidyl ether, tris(4-hydroxyphenyl) methane triglycidyl ether or diglycidyl 1,2-cyclohexanedicarboxylate and the like. Examples of isocyanate crosslinking agents include aromatic and aliphatic diisocyanates; examples of aliphatic diisocyanates include hexamethylene diisocyanate (HMDI), dimers, trimmers, or multimers of HMDI (e.g. DESMODUR™ N100, N3300A, N3600 from Bayer), isophorone diisocyanate, methylene dicyclohexyl diisocyanate, xylylene diisocyanate, cyclohexane diisocyanate, tetramethyl xylylene diisocyanate, isopropenyl dimethylbenzyl isocyanate, trimethylhexamethylene diisocyanate, norbornane diisocyanate or the like. Examples of aromatic diisocyanates include diphenylmethane diisocyante, toluene diisocyanate, p-phenylene diisocyanate, naphthalene diisocyanate or the like. The isocyanate crosslinking agent may be a blocked isocyanate, e.g. a malonate, triazole, caprolactam, sulfite, phenol, keotoxime, pyrazole or alcohol blocked isocyanate. A blocked isocyanate may be advantageous in some embodiments, as it may remain unreactive with other components of the formulation until 'unblocking'—unblocking of the blocked isocyanate may be performed, for example, by heating the formulation. The cross linker may be present in a composition or formulation in an amount of about 0.01% to about 10%, or any amount or range therebetween, for example 0.02, 0.04, 0.06, 0.08, 0.1, 0.2, 0.3, 0.4, 0.5, 1, 2, 3, 4, 5, 6, 7, 8, or 9 wt %.

Hardeners: An epoxide crosslinking agent may be used in combination with a hardener. A hardener ("curing agent") may be an anhydride, for example MHHPA (methylhexahydrophthalic anhydride) THPA (tetrahydrophthalic anhydride), MTHPA (methyltetrahydrophthalic anhydride), HHPA (hexahydrophthalic anhydride), 4-MHHPA or the like. A hardener may be soluble in a solvent portion of the switching material. A hardener may be present in a composition or formulation in an amount of about 0.5% to about 10%, or any amount or range therebetween, for example 1, 2, 3, 4, 5, 6, 7, 8, or 9 wt %.

Accelerant: An accelerant may alternately be referred to as a 'catalyst'. In some embodiments, an accelerant may be a Lewis acid or a Bronstead acid. In some embodiments, an accelerant may comprise a transition metal. In some embodiments, an accelerant may comprise an organometallic complex, wherein the metal component is a transition metal. Examples of transition metals may include Mn, Sn, V, Bi, Zn, Co, Zr, Al, Cr, Ti, or Cu, or the like. An accelerant may be soluble in a solvent portion of a switching material. Examples of accelerants that may be used with materials comprising an epoxide reactive group may include AMC-2 (chromium 2-ethylhexanoate in Palatinol 711P), ATC-3 (AMPAC Fine Chemicals), zinc 2-ethyl hexanoate (99%, or 80% in mineral spirits), AC8 (Available from Broadview), CXC1612 or CXC1613 (King Industries), 1,4-diazabicyclo[2.2.2]octane (DABCO), HCl, p-toluenesulfonic acid, potassium t-butoxide, Tyzor ZEC (Dorf-Ketal), Tyzor AA75 (Dorf-Ketal), titanium tetraisopropoxide, copper (II) chloride. Examples of accelerants that may be used with materials comprising an isocyanate reactive group may include dibutyltin dilaurate, dibutyltin diacetate, dibutyltin oxide, transition metal complexes of acetylacetonates, octanoates, metal chelates or the like. A pot life extender (e.g. 2,4 pentanedione or "PD") may be included in a composition with the accelerant. Where the crosslinker is an aldehyde, the accelerant may be a Bronstead acid, or a Lewis acid. Examples include HCl, p-toluenesulfonic acid, methanesulfonic acid, p-toluenesulfonic acid:pyridine complex, N-bromosuccinimide, iron trichloride, ammonium triflate, 1,3-Bis[3,5-bis(trifluoromethyl)phenyl]thiourea, 1,3-bis[3,5-bis(trifluoromethyl)phenyl]thiourea with mandelic acid, sulfuric acid, trifluoroacetic acid, titanium tetraisopropoxide, zinc chloride, acetic acid, chloroacetic acid, phosphoric acid, maleic acid, oxalic acid, p-toluenesulfonic acid:DBU complex, ammonium nitrate. In some embodiments, the acid may be selected from a group comprising HCl, p-toluenesulfonic acid, methanesulfonic acid, p-toluenesulfonic acid:pyridine complex, N-bromosuccinimide, iron trichloride, ammonium triflate, 1,3-bis[3,5-bis(trifluoromethyl)phenyl]thiourea, 1,3-bis[3,5-bis(trifluoromethyl)phenyl]thiourea with mandelic acid, and sulfuric acid. An accelerant may be present in a switching material, composition or formulation in an amount of about 0.001% to about 1%, or any amount or range therebetween, for example, 0.002, 0.005, 0.01, 0.05, 0.1, 0.2, 0.3, 0.4, 0.5, 0.6, 0.7, 0.8 or 0.9 wt %.

Other polymers: In some embodiments, the switching material, composition or formulation may further comprise one or more additional polymers, the one or more additional polymers may be crosslinkable or may not be crosslinkable. The one or more additional polymers may be a rheology modifier. The one or more additional polymers may be soluble in a solvent portion of a switching material. Examples of second polymers include poly(methyl methacrylate) (PMMA), nitrile butadiene rubber (NBR), polyvinylpyrrolidone (PVP), polyvinylidene fluoride (PVDF), poly(dimethylsiloxane) (PDMS), poly(ethyl methacrylate) (PEMA), hydroxypropyl cellulose, PEG-DMA (poly(ethylene glycol)dimethacrylate), PHEMA (poly(2-hydroxyethyl methacrylate), Plexiglas™ G-UVT acrylic, polychloroprene, polybutadiene, PDMS-g-PEG (PEG-modified PDMS), PEO (polyethylene oxide), PEG-MEMA (PEG-methylether methacrylate), silicones, PDMS, PPGMA (poly(propylene glycol), EGDMA (ethylene glycol dimethacrylate), PVDC (polyvinylidene chloride), PVC (polychlorovinyl), PVDC-PVC, cyclo olefin copolymer (COC) (APEL™), carboxymethyl cellulose (CMC), SOLEF™ 21520, SOLEF™ 21508, zein, polyisobytulene-600, poly(ethylene-co-methacrylic acid (SURLYN™ 60), polyethylene-co-(ethylacrylate), ethylacrylate, poly(vinylidene chloride-co-vinyl chloride), polyisoprene, polybutene, poly(sodium 4-styrene sulfonate), HEMA (hydroxyethyl)methacrylate or combinations thereof, or copolymers thereof. Examples of sol-gels include silicon-oxygen based sol-gels, aluminum-oxide based sol-gels, titanium-oxide sol-gels or combinations thereof. In some embodiments, the one or more polymers or sol-gels may be present in an amount from about 0.1% to about 10% (by weight) or any amount or range therebetween, for example 1, 2, 3, 4, 5, 6, 7, 8, or 9%, or any amount or range therebetween. In some embodiments the one or more polymers or sol-gels may function as a rheology modifier. Inclusion of a rheology modifier may increase viscosity of a formulation in an uncured or partially cured state, and may facilitate handling of the composition (e.g. allow or improve coating of a moving web, allow or improve molding of the composition).

Switchable compound: in some embodiments, the switchable compound may comprise, photochromic properties, electrochromic properties, or both photochromic and electrochromic properties. In some embodiments, the transition of the switchable material between dark and faded states may be temperature independent. In some embodiments the switchable compound darkens (visible light transmission decreases) when exposed to light comprising wavelengths of about 420 nm or less (including UV light, and some short-wavelength visible light), and fades (visible light transmission increases) when an electric potential is applied across first and second electrodes and/or when exposed to light of from about 500 to about 750 nm. The switchable compound may additionally fade when exposed to light of about 500-550 nm. A switchable compound may be soluble in a solvent portion of a switching material. In some embodiments, the switchable compound may be a switchable plasticizer. Without wishing to be bound by theory, the switchable compound may embed within the polymer matrix and increase the free volume of the polymer; this may provide a reduced glass transition temperature, reduced brittleness, increased flexibility and/or increased durability. In some embodiments, increasing concentration of switchable compound may decrease the viscosity of the polymer matrix. In some embodiments, the hardness of the layer may decrease with increasing concentration of switchable compound in the layer. In some embodiments, the switchable compound may also be suitable for transport of charge within the interlayer. Examples of such switchable compounds include hybrid photochromic/electrochromic (hybrid P/E or P/E) compounds. Hybrid P/E compounds are generally organic, and include hexatrienes, diarylethenes, dithienylcyclopentenes and fulgides. Oxidation of the hybrid P/E compound to interconvert between a ring-closed and a ring-opened form may be induced by application of a voltage to a switchable material comprising the compound, and may be independent of the polarity of the applied voltage. In some embodiments, the hybrid P/E compound may be an anodic species, that is, the electrochromic colour change (electrochromic fading, electrochromic transition from a dark state to a light state) occurs primarily at the anode of an electrochromic film or device. In other embodiments, the hybrid P/E compound may be a cathodic species, where the electrochromic color change occurs at the cathode of an electrochromic film or device.

The hybrid P/E compounds may be compounds according to Formula I, inclusive of A and B isomers. The compounds each comprise two or more isomers, including ring-open, or open, isomers (Isomer A) and ring-closed, or closed, isomers (Isomer B). These compounds are reversibly convertible between open and closed forms. When used herein, a numeral or alpha-numeric reference (with suffix 'A') denotes the ring-open isomer of a compound, and a primed numeral or alpha-numeric reference (with suffix 'B') denotes the ring-closed isomer of the same compound.

Compounds according to various embodiments of the invention may undergo catalytic electrochemical oxidation. The electrochemical conditions may be catalytic conditions, and compounds according to various embodiments of the invention may undergo catalytic electrochemical oxidation. Catalytic electrochromism of selected diarylethenes has been demonstrated and is described in U.S. Pat. No. 7,777,050. The electrochemical conditions may be catalytic conditions and methods of switchable, or operating, a switchable material from a dark to a faded state may employ application of a catalytic electric charge. A catalytic amount of an electric charge may be positive or negative, and may be from about 0 to about 5 volts, or any amount or range therebetween. One or more hybrid P/E compounds according to various embodiments of the invention may be present in a switchable material in an amount (% weight) of about 0.05% to about 30%, or any amount or range therebetween, for example about 1, 2, 3, 4, 5, 6, 7, 8, 9, 10, 11, 12, 13, 14, 15, 16, 17, 18, 19, 20, 21, 22, 23 24, 25, 26, 27, 28 or 29%.

Examples of diarylethene compounds are described in U.S. Pat. No. 7,777,055, WO2010/142019 and PCT/CA2012/000910, all of which are incorporated herein by reference.

Examples include 1,2 diaryl cyclopentene compounds reversibly convertible between Formula 1A (ring-open isomer) and Formula 1B (ring-closed isomer) of Scheme 1 or Formula VIIA and VIIB of Scheme 23:

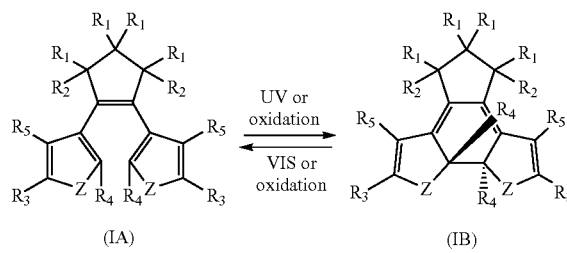

(IA)    (IB)

wherein

Z is N, O or S;

Each $R_1$ is independently selected from the group consisting of H, halo;

Halo is F, Cl, Br, I;

Each $R_2$ is independently selected from the group consisting of H, halo, a polymer backbone, alkyl or aryl; or, when both $R_2$ together form —CH=CH— and form part of a polymer backbone;

Each $R_3$ is independently selected from the group consisting of H, halo, $CO_ZY$, alkyl, alkoxy, thioalkyl,

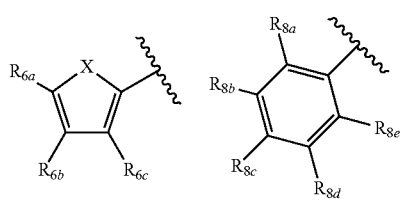

or aryl, and Y is independently selected from the group comprising H, a metal, alkyl, aryl, —(O—CH$_2$CH$_2$)$_4$—H, or

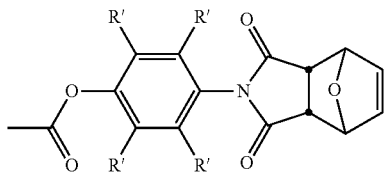

Each $R_4$ is independently selected from the group consisting of

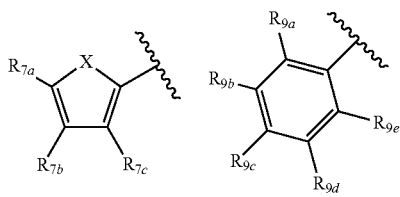

or aryl;

Each $R_5$ is independently selected from the group consisting of H, halo, alkyl, alkoxy, thioalkyl or aryl; and X=N, O or S.

In another embodiment, $R_3$ and $R_5$ are —CH=CH— and joined to form an unsaturated ring, providing a compound reversibly convertible between Formula VIIA (ring-open isomer) and Formula VIIB (ring-closed isomer) of Scheme 2:

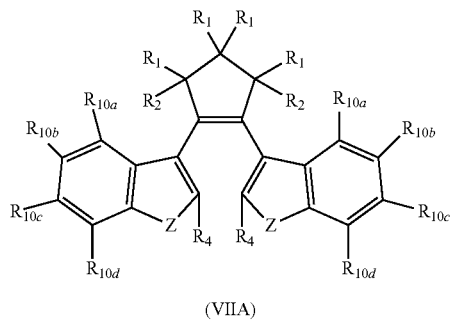

(VIIA)    (VIIB)

wherein;

Z is N, O or S;

Each $R_1$ is independently selected from the group consisting of H, halo;

Each $R_2$ is independently selected from the group consisting of H, halo, a polymer backbone, alkyl or aryl; or, when both $R_2$ together form —CH=CH— and form part of a polymer backbone.

Each $R_{6a}$, $R_{6b}$, and $R_{6c}$; $R_{7a}$, $R_{7b}$ and $R_{7c}$; $R_{8a}$, $R_{8b}$, $R_{8c}$, $R_{8d}$ and $R_{8e}$; $R_{9a}$, $R_{9b}$, $R_{9c}$, $R_{9d}$ and $R_{9e}$; $R_{10a}$, $R_{10b}$, $R_{10c}$ and $R_{10d}$ may be independently selected from the group consisting of H, halo, —OH, alkyl, alkoxy, ether, silyl, thioalkyl, aryl or $CO_2Y$, and Y is as referenced herein. Alkyl may be from 1 to 10 carbons, linear or branched. Aryl may be phenyl, thiophene, substituted phenyl, substituted thiophene. Each of the substituted aryls may be substituted in the 1, 2, 3, 4, or 5 position by an alkyl, ether, —OH, halo, Examples of hybrid P/E compounds include:
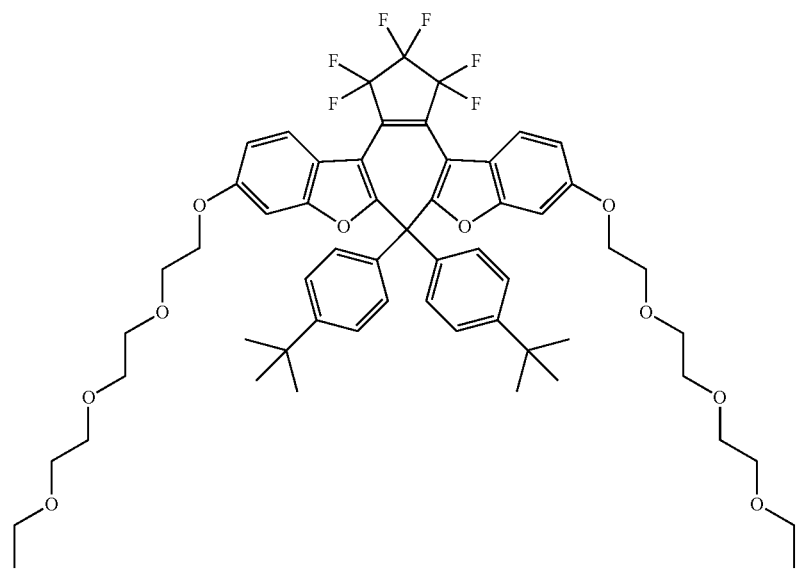
S161
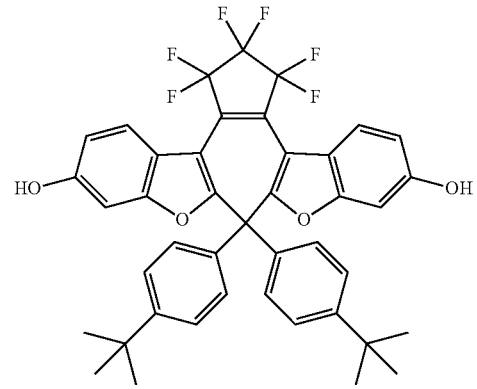
S162
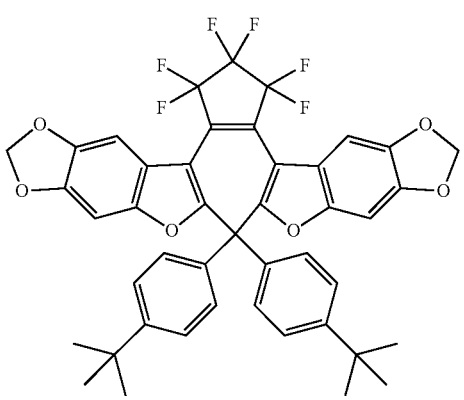
S163
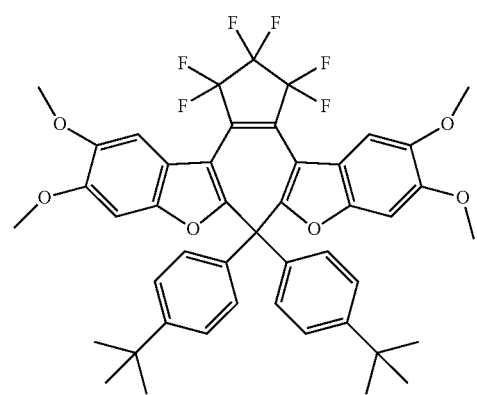
S164

-continued

S108

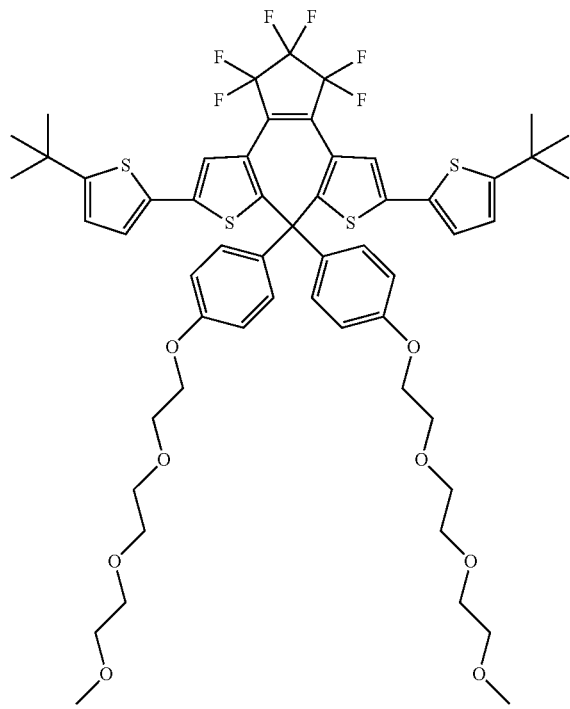

S109

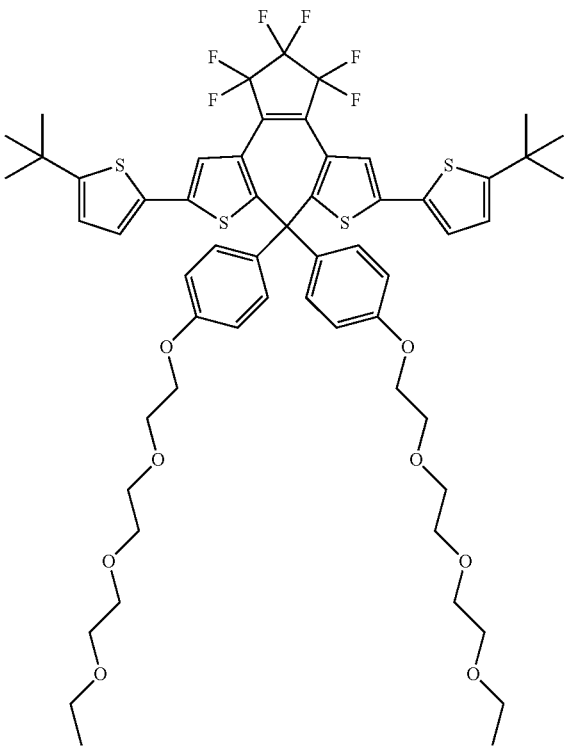

S158

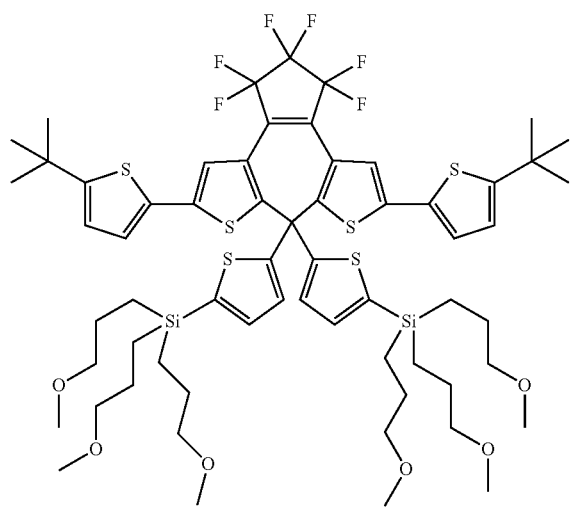

Solvent portion: An electrolyte component of a switching material may comprise a solvent portion. The solvent portion may comprise one or more solvents, the one or more solvents may alternately be referred to as plasticizers. In some embodiments, the solvent may have one or more of the following characteristics: a boiling point of about 150° C. or greater, a vapour pressure of about 0.001 mmHg or less at 20° C., a Yellowness Index (YI) of about 6 or less; a flash point of about 80° C. or greater, a melting point of about 40° C. or less. The one or more solvents may be a plasticizer, or act as a plasticizer. In some embodiments, the one or more solvents may have a low dielectric constant. In some embodiments the one or more solvents has a dielectric constant of 5 or greater, or of about 10 or greater, or of about 15 or greater.

In some embodiments, the one or more solvents, when combined with chromophore (5 wt %) demonstrates suitable photo stability, shown by darkening performance of 90-100% of baseline for at least 250 hours of weathering, exposed to a light source providing 0.68 W/m$^2$ of UV light at a wavelength of 340 nm—or about 0.6 MJ/m$^2$ cumulative exposure). In other embodiments, the one or more solvents demonstrates suitable photostability for at least 300, 400 or 500 hours of weathering.

The one or more solvents may be selected to avoid HCN or HCl degradation products (e.g. when tested for photostability under natural or simulated sunlight) and/or avoid one or more of NH (amino) functional groups, aromatic groups, or primary alcohol groups. In some embodiments, the solvent does not contain water, or does not contain more than 2% water.

Examples of solvents include triglyme, tetraglyme, propylene carbonate, ethylene carbonate, 1,2-butylene carbonate (BC), delta-valerolactone, formamide, 3-methyl-2-oxazolidone, phthalide, tetramethylurea, butyrolactone, cyclopentanone, ethylene glycol phenyl ether; diethylene glycol monobutyl ether; diethyl succinate; dimethylglutarate; N-methylpyrrolidone (NMP) ethyl myristate; mineral seal oil; diethylene glycol n-butyl ether acetate; Eastman C11 ketone; diisobutyl adipate; dihexyl azelate; diethyl maleate; diisooctyl azelate; triethylene glycol monobutyl ether (butoxytriglycol); diisooctyl dodecanedioate; 2-(2-ethylhexyloxyl)ethanol; glyceryl triacetate; tetramethylene sulfoxide; dibutyl adipate; 3-dodecylheptamethyltrisiloxane; diethyl sebacate; dibutyl itaconate; 1,4-Butanediol; butyl sulfoxide; diethylene glycol; octyl octanoate; hexyl octanoate; diisodecyl adipate; diethylene glycol monoethyl ether acetate; 1,3/1,4-cyclohexanedimethanol (CHDM); 1-Decanol; 2-methylglutaronitrile; methyl palmitate; tri(propylene glycol) butyl ether (Dowanol™ TPnB); 1-Dodecanol; tetradecane; diethylene glycol hexyl ether; dioctyl ether; methyl stearate; hexyl hexanoate; butyl diglyme; triisopentylamine; Bis(2-ethylhexyl) sebacate; 1,5-dicyanopentane; diisobutyl fumarate; 2,2,4-trimethyl-1,3-pentanediol dibenzoate; poly (ethylene glycol)monolaurate; isooctyl tallate; poly(ethylene glycol)monooleate; hexaethyldisiloxane; poly(ethylene glycol)dioleate; triethylene glycol di-2-ethyl butyrate (TEG DEB); tributyrin (butanoic acid), 1,2,3-propanetriyl ester; tetramethylene sulfone (sulfolane); polyethylene glycol dimethyl ether m.w. ~250 (PEG-DME 250); bis(2-ethylhexyl) adipate; tetraethylene glycol; hexa-decamethylheptasiloxane; dioctyl terephthalate; Bis[2-(2-butoxyethoxy) ethyl] adipate (BEEA); triethylene glycol bis(2-ethylhexanoate) (TEG BEH); propylene carbonate (PC); triethylene glycol monomethyl ether (methoxytriglycol); triethylene glycol monoethyl ether (ethoxytriglycol); 18-crown-Ether; 1,3-dimethylimidazolidinone (DMI); poly (ethylene glycol)bis(2-ethylhexanoate); 1,5-pentanediol; di(ethylene glycol)dibenzoate; 2-ethylhexyl-(s)-lactate; tripropylene glycol; dipropylene glycol; 2,2,4-trimethyl-1, 3-pentanediol monoisobutyrate ("Texanol"); tri(propylene glycol) methyl ether (TPM); di(propylene glycol)dibenzoate; dipropylene glycol n-butyl ether; diethyl azelate; dimethyl adipate (DMAd), diethyl adipate (DEAd), poly(propylene glycol)dibenzoate; propylene glycol phenyl ether; poly(ethylene glycol)dibenzoate; 2-ethyl-1,3-hexanediol; propylene glycol diacetate (PGDA), dibutyl itaconate (BI), dimethylglutarate, diethyl-2-dimethyl glutarate, dimethyl-2-methyl glutarate (Rhodiasolv IRIS,IRIS, RI); or the like. In some embodiments, the solvent is optically clear, or substantially optically clear, and the one or more salt, rheology modifiers, gelling agents, polymers, co-solvents, accelerants, hardeners, epoxies and other components of a switching material or composition are soluble in the solvent. In some embodiments, the solvent is a Lewis base. In some embodiments, the solvent does not comprise nitrogen. In some embodiments, the solvent does not include a lactone group, or a lactam group. Without wishing to be bound by theory, it may be preferable to avoid lactone- or lactam-containing solvents, as they may polymerize. In some embodiments, it may be preferable to avoid solvents with carbon-carbon double bonds, as these molecules may interact with UV light that maybe used to operate the switching material.

The solvent portion of a switching material or composition may comprise an amount from about 30% to about 95% (by weight), or any amount or range therebetween, for example 30, 40, 50, 60, 70, 80 or 90%, or any amount or range therebetween.

Salt: A switching material may further comprise a salt. A salt is generally inert, has a high ionic strength in solution, and generally comprises a cation and an anion pair. In a solution, a salt may separate into cation and anion components, forming a solution in the solvent portion, which may migrate to negative and positive electrodes in a system where electricity is applied, such as a switchable film comprising a switching material and first and second electrodes. In some embodiments a salt may be described generally as a "supporting electrolyte"; a medium incorporating one or more salts may be described generally as an "ionic medium". In some embodiments, the cation, the anion or the cation and the anion may be an organic cation or an organic anion. Examples of cations include alkali metal (e.g. Li, Na, K, Cs) ions; examples of organic cations include tetralkylammonium or tetraalkylphosphonium, where "alkyl" may be from 1 to 10 carbons (e.g. methyl, ethyl, propyl, butyl, pentyl, hexyl, phenyl, or the like), for example tetramethyl ammonium (TMA), tetraethyl ammonium (TEA), tetrabutyl ammonium (TBA), tetramethyl phosphonium (TMP), tetraethyl phosphonium (TEP), tetrabutyl phosphonium (TBP), tetraphenyl phosphonium (TPP) tributylmethylphosphonium (TMP) or the like. Examples of anions include halide (F, Cl, Br) ions, perchlorate ($ClO_4$), nitrate ($NO_3$), sulfate ($SO_4$); examples of organic anions include, tetrafluoroborate ($-BF_4$), hexafluorophosphate ($PF_6$), trifluoromethanesulfonate (TFMS), tetraphenylborate ($(C_6H_5)_4B$; or "$BPh_4$"), bis(trifluoromethanesulfonyl)imide (-TFSI), bis(oxotlato)borate (BOB) ions, or the like Examples of salts include NaCl, $NaClO_4$, $NaNO_3$, $NaBF_4$, $NaPF_6$, NaTFMS, NaTPB, KCl, $KSO_4$, $KNO_3$, $KBF_4$, $KCF_3SO_3$, $KClO_4$, $KPF_6$, $KC_6H_5_4B$, CsCl, $CsClO_4$, $Cs_2O_4S$, $CsNO_3$, $CsBF_4$, $CsF_6P$, CsTFMS, CsTPB, TMACl, $TMABF_4$, $TMANO_3$, TMATFMS, $TEABF_4$, TEACl, TEA-$ClO_4$, $TEASO_4$, $TEANO_3$, TEAPF6, TEATFMS, TEABF4, TBACl, $TBAClO_4$, $TBABF_4$, $TBAPF_6$, $TBABPh_4$, $TBANO_3$, TBATFMS, TBA-TFSI, $TBPBF_4$, $TBPPF_6$, $TPBBPh_4$, LiTFSI, triflate, lithium bis(oxatlato)borate (Li-BOB), lithium perchlorate ($LiClO_4$) or the like. The one or more salts may be present in an amount from about 0.05% to about 10% (by weight) or any amount or range therebetween, for example 0.05, 0.1, 0.2, 0.4, 0.6, 0.8, 1, 2, 3, 4, 5, 6, 7, 8, or 9%.

A solvent portion comprising one or more solvents, together with one or more salts, may be referred to as an electrolyte, or an electrolyte portion of the switching material. The electrolyte may comprise a mobile phase of the switching material and allow sufficient mobility of the chromophore(s) to facilitate the oxidative ring opening of chromophores.

Sacrificial solvent: a sacrificial solvent (co-solvent) may be included in a composition to confer advantageous or preferred characteristics to the composition. Such characteristics may include reduced viscosity, slower polymerization rate, coatability or the like. The switching material or components thereof, may be soluble in the sacrificial solvent. A co-solvent is compatible with other components of the composition. A co-solvent may be selected from a group comprising toluene, tetrahydrofuran (THF), methyl ethyl ketone (MEK), ethyl acetate or the like. A composition may comprise from about 10% to about 75% (by weight) of a co-solvent, or any amount or range therebetween, for example, 10, 20, 30, 40, 50, 60 or 77%, or any amount or range therebetween. In some embodiments, a co-solvent may comprise from about 1, to about 1.5, to about 2, to about 2.5 or to about 3 equivalents in a composition.

Additionally, switching material or compositions may further comprise one or more other additives, such as dyes, UV light stabilizers, antioxidants, surfactants, adhesion promoters, charge carriers, charge compensators or the like.

Increasing or decreasing the amount of accelerant, cross-linking agent or the like may increase or decrease pot-life; some accelerants may have different reactivity with different reactive groups, for example, some accelerants may interact more readily with a primary —OH group compared to a secondary —OH group, whereas others, may interact more readily with a secondary —OH or a tertiary —OH group, relative. It may be desirable in some embodiments to include a blocked isocyanate crosslinking agent.

Methods of Preparing Switchable Materials and Coatable Formulations:

In some embodiments, components of the switching material may be combined in particular order, or in particular subcombinations ('parts'), with the parts combined at a later point. Preparation of first, second and/or third parts may be advantageous to solubilize one or more components of a switching material, prevent side reactions, or to prevent initiation of crosslinking ('curing') before the formulation is complete or ready for casting or coating. Thus, there is further provided, in part, a method of making a switching material, comprising the steps of: providing a first part comprising a polymer, an optional hybrid P/E compound, an salt and a first portion of a solvent; providing a second part comprising an optional hardener, a crosslinking agent and a second portion of the solvent; providing an accelerant and an optional co-solvent; combining the first part and the second part; and combining the third part with the combined first and second parts. Where a blocked isocyanate is included, the components of the coatable switching material may be prepared as a single mixture, the blocking group preventing crosslinking. Where a blocked isocyanate is included, a method of preparing a switchable material may include a step of unblocking (e.g. heating to a suitable temperature) before curing proceeds.

The switching material may be coatable (a coatable switching material or formulation). A coatable switching material is one that is of suitable viscosity to be applied to a substrate in a suitable thickness and substantially uniform manner. Viscosity of a switching material may be altered by increasing or decreasing the quantity of sacrificial solvent, altering the polymer (different quantity and/or molecular mass), increasing or decreasing temperature of the switching material, inclusion of a rheology modifier or the like. In some embodiments, the switching material does not include a sacrificial solvent, and viscosity is manipulated by heating the switching material and/or using a heated die for coating. Partial curing of the switching material in advance of, or during the process of coating, may also increase the viscosity of the switching material applied to a moving web, or extruded or injected into a mold or extruded or applied onto a substrate. Curing may be slowed or stopped by decreasing temperature, and/or diluting the partially cured material with a co-solvent. Increasing temperature and/or removal of the co-solvent may subsequently allow curing to proceed to completion. The switching material may be prepared as a sheet or layer by extrusion through a sheeting die under pressure; the die may be heated.

The switching material, or one or more parts thereof may be treated to remove dissolved gas (oxygen, air, or the like), and/or treated to remove water, or prepared in an environment with reduced oxygen and/or reduced humidity. In some embodiments, one or more of the steps of making a switchable formulation, coating a substrate, or curing the film may be performed in an inert atmosphere (e.g. nitrogen, with less than 100 ppm oxygen, less than 100 ppm water, or both); a reduced humidity atmosphere (e.g. about 5-15% relative humidity), or in an open atmosphere. In some embodiments, a method of making a coatable formulation, coating of substrates and/or curing of a switching material may be performed in a reduced humidity and/or reduced oxygen environment, for example less than 100 ppm relative humidity, and/or less than 100 ppm oxygen.

A switching material may be coated at a suitable thickness onto a conductive coating of a substrate using a slot die, knife coater, roll-to-roll coating method, extrusion, dipping, spraying, spin coating, hand-drawing or the like. A suitable coating thickness may be selected such that the switching material is of the desired thickness once the co-solvent is evaporated (if a co-solvent is present), or the final layer is of the desired thickness following cooling and/or crosslinking of the coated switching material. For example, to obtain a final thickness of about 50 microns, a switching material with co-solvent may be applied to the substrate in a layer of about 100 to about 120 microns. A second layer of substrate is laminated on top of the coated switching material (conductive side in contact with the switching material) to form a sandwich structure. The laminated 'sandwich' may be cured, or allowed to continue to cure (if curing is initiated during the coating or laminating process) and if desired, cut to a suitable size. Busbars or other electrical contacts may be added if desired.

In some embodiments, when the switching material is disposed upon, or sandwiched between the substrate(s), the switching material is optically clear before, after or before and after lamination (e.g. demonstrating a haze of less than about 5%, less than about 4%, less than about 3%, less than about 2% or less than about 1%. Haze may be measured using methods known in the art, for example use of an XL-211 Hazemeter from BYK-Gardner, according to manufacturer's instructions.

A second substrate may be laminated on top of the disposed switching material (with a conductive layer of the second substrate in contact with the switching material) to provide a switchable (variable transmittance) optical filter. If desired, the switchable optical filter may be cut to a desired size or shape, and electrical contacts (e.g. busbars, wires or the like) may be added, to facilitate application of a voltage to the switching material. The step of laminating may be preceded by, or followed by, a step of crosslinking or curing of the switching material. The step of curing may comprise heating the switching material to a temperature suitable for crosslinking (e.g. about 20° C. to about 90° C., or any amount or range therebetween. The step of disposing may be preceded by a step of filtration of the switching material.

In other methods, a switching material, or one or more components of the switching material, may be formed into pellets, chips or flakes and mixed with other components of the switching material, and/or a thermoplastic material (e.g. in a screw mixer) and extruded through a die to form one or more layers or films. The mixer, die and/or extruder may be heated. Alternately, the extruded material may itself be pelletized, for subsequent blending with other materials and extruded in a second extruder to produce a switchable film, or molded to produce a switchable article.

A substrate may be rigid or flexible—an optical filter comprising one or more flexible substrate(s) may be in the form of a film that may be applied to a rigid material, such as a pane of a window, or a lens. A substrate may comprise glass, plastics or thermoplastic polymers. Examples of glass include float glass, tempered glass, laminated glass, tinted glass, mirrored glass, flexible glass (e.g. Willow Glass from Corning), reinforced glass, chemically-strengthened glass (e.g. alkali-aluminosilicate glass—GorillaGlass from Corning), monolithic glass, multilayered glass, safety glass, bullet-resistant glass or "one-way" bullet-resistance glass. Examples of thermoplastic polymers include polyesters (PE), polycarbonates, polyamides, polyurethanes, polyacrylonitriles, polyacrylacids, (e.g. poly(methacrylic acid), including polyethylene terephthalate (PET), polyolefins (PO) or copolymers or heteropolymers of any one or more of the above, or copolymers or blends of any one or more of the above with poly(siloxane)s, poly(phosphazenes)s, or latex. Examples of polyesters include homopolymers or copolymers of aliphatic, semi-aromatic or aromatic monomeric units, for example polycondensed 4-hydroxybenzoic acid and 6-hydroxynapthalene-2-carboxylic acid (VECTRAN™), polyethylene napthalate (PEN), polytrimethylene terephthalate (PTT), polybutylene terephthalate (PBT), polyethylene terephthalate (PET), polyhydroxyalkanoate (PHA), polyethylene adipate (PEA), polycaprolactone (PCL) polylactic acid (PLA), polyglycolic acid (PGA) or the like. Examples of polycarbonates include bisphenol A, polycarbonate or the like. Examples of thermoplastic polymers include polyethene (PE), polypropylene (PP) and the like. The substrate may have UV, IR or VIS light blocking characteristics. Other examples of substrate materials include ceramic spinel or aluminum oxynitride.

The substrate may be of uniform or varying thickness, and of any suitable dimension. For example, the substrate may have a thickness from about 0.01 mm to about 10 mm, or any amount or range therebetween, for example 0.05, 0.1, 0.5, 1, 2, 3, 4, 5, 6, 7, 8, 9 or 10 mm, or from about 0.012 mm to about 10 mm, or from about 0.5 mm to 10 mm, or from about 1 mm to 5 mm, or from about 0.024 mm to about 0.6 mm, or from about 0.051 mm (2 mil) to about 0.178 mm (7 mil). In some embodiments, the thickness and/or material of a first substrate differs from the thickness and/or material of a second substrate. In some embodiments, a substrate with a conductive layer may be ITO-coated glass, or ITO-coated PET.

A transparent conductive layer (electrode) may comprise, for example, metals, metal alloys, metal oxides, conjugated organic polymers, conductive carbon-rich materials and fine wire meshes. Exemplary conductive materials include layers of indium tin oxide (ITO), doped tin oxide, doped zinc oxide, doped cadmium oxide, fluorine tin oxide, antimony tin oxide, cubic strontium germanium oxide, polyaniline, graphene, fullerenes, carbon nanotubes, PEDOT (poly(3,4-ethylenedioxythiophene)), PEDOT:PSS (poly(3,4-ethylenedioxythiophene)poly(styrenesulfonate), and polypyrrole, as well as thin, substantially transparent metallic layers such as gold, silver, aluminum, and nickel alloy. Methods of applying the electrically conductive material to a substrate to form suitable conductive layers and electrodes are known, for example chemical deposition, sputter coating or the like. The conductive layer may be of thickness that provides adequate conductance for operation of the electrodes, and which does not appreciably interfere with the transmission of light. The thickness of the conductive layer may be from about 1 nanometer to about 90 microns, or any amount or range therebetween. In some embodiments, a conductive material may be dissolved in a suitable solvent and cast in a layer (a transparent conductive layer), and used in a composite optical filter without being applied to a substrate.

Thus, there is further provided, in part, a method of making a switchable film. A first substrate with a conductive coating is provided, and a flowable switching material disposed thereon. The switching material may be provided by a dispensing unit and a distributer to dispose evenly on the surface of the conductive coating a layer of the switching material. The dispensing unit may be a syringe, flask or similar container; larger volumes, or coating methods for intended for continuous or semi-continuous throughput may necessitate the use of a reservoir and pump, suitable nozzles or outlets or the like. The distributer may be a knife or dispensing bar with a machined edge to provide for an even distribution of switching material of a selected thickness. In other embodiments, the switching material may be dispensed onto the surface and later distributed evenly by passing through a roll-press. For example, following dispensing, and optionally distributing, the switching material onto the surface, a second substrate with conductive coating may be applied (with conductive coating contacting the switching material) to the layer of switching material, and the 'sandwich' of switching material and substrates with coating passed between a roller nip to press the sandwich together, to provide an optical filter. The final thickness may be determined by the gap of the roller nip. For switching materials that include a co-solvent to provide a suitable viscosity for coating, the co-solvent may be removed (e.g. evaporation) before application of the second substrate. For materials that do not include a co-solvent to provide a suitable viscosity, no step of evaporation is necessary and the second substrate may be applied following dispensing and optional distribution of the switching material. To provide a suitable viscosity for coating, the switching material (without co-solvent) may be heated prior to and/or during application, using heated coating knives or bars, heated reservoir, heated roller nips or the like.

Once the switchable film has been made (and cut to shape and contacts added if desired), it may be laminated between two layers of an adhesive resin and that between two sheets of glass. Advantageously, switching materials and films as described herein may be laminated in glass with hot-melt adhesive layers, using temperatures and pressures used in conventional glass lamination. The switchable material and films do not demonstrate increased haze following heat lamination, A glass-adhesive-switchable film—adhesive-glass sandwich may be passed through a press roll, pressed between plates at an elevated temperature (about 90° C. to about 140° C.—pressure and temperature may be increased and decreased over several steps), or may be placed in a bag (rubber), with an initial bonding at a temperature of about 70° C.-110° C., while applying a vacuum to remove air between the layers. A second bonding step is then performed at a temperature of about 120° C.-150° C., with pressure (e.g. about 0.95 to about 1.5 MPa in an autoclave).

The first and/or second substrates may block, or absorb, selected ranges or wavelengths of light. In some embodiments the first and/or second substrates may be treated with, or have applied to them, a layer or coating that blocks (reflects or absorbs) selected ranges or wavelengths of light. In some embodiments, the range or wavelength of light may be in the UV range. Examples of UV blocking films that may be applied include EnergyFilm™ (described in WO2002/018132) and EnerLogic™ (described in WO2009/087575). In some embodiments the substrate is PET with a coating that blocks light of wavelengths of about 375 nm or less.

In some embodiments, the switching material, or an optical filter comprising the switching material, may be disposed upon a pane of glass, or other transparent material suitable for use as a window, or incorporation into an insulated glazing unit (IGU), or a storm window or secondary glazing. Methods of making IGU, windows or the like, and affixing an optical filter to glass or other suitable material are described in, for example, WO2010/142019 as are methods of configuring an electrical system and/or control system for operation (electrofading) of an IGU comprising an optical filter. In some embodiments, the switching material may be incorporated into an opthalmic device (e.g. visors, masks, goggles, lenses, eyeglasses (prescription or not) or the like). In some embodiments, the switching material may be used in glazing products such as architectural installations or vehicle (e.g. truck, car, airplane, train, or the like) installations. Architectural installations may be external-facing, or internal to the building, and may include a window, wall (e.g. partition, divider, full or partial wall, permanent or temporary wall), display (e.g. illuminated information panels, touchscreens, control panels). Vehicle installations include windows, sunroofs or other glazings, including sunroofs of various types including pop-up, spoiler, inbuilt, folding sunroofs, panoramic roof systems or removable roof panels. Vehicle windows include windshields, rear windows, side windows, sidelight windows, internal dividers (movable or not) to divide the interior space of a vehicle for temporary or permanent purposes. Electrical power may be provided by a separate battery, or the device may be connected to an electrical system of the device—it may be wired into a vehicle or building's electrical system.

Kits

There is further provided, in part, a kit for making a switching material comprising a switching material, and instructions for its use. The kit may further comprise an accelerant; the accelerant may be separately packaged from the one or more components of the switching material. The switching material may comprise one or more polymers; the kit may further comprise an electrolyte, or a salt for combining with a solvent to provide an electrolyte.

The kit may comprise the components of a switching material for making a switching material, the components divided into multiple parts. A kit may comprise: 1) a first part comprising a polymer, a salt and a first portion of a solvent; the first part may further comprise an optional hybrid P/E compound, or the optional hybrid P/E compound may be provided separately for combining with the first part; 2) a second part comprising a cross linking agent, an optional hardener and a second portion of the solvent; and 3) a third part comprising an accelerator, along with instructions for combining the parts, and/or conditions for mixing and adjusting viscosity if needed to provide a coatable switching material.

The term "mil" as used herein, refers to the unit of length for $1/1000$ of an inch (0.001). One (1) mil is about 25 microns; such dimensions may be used to describe the thickness of an optical filter or components of an optical filter. One of skill in the art is able to interconvert a dimension in 'mil' to microns, and vice versa.

"About" as used herein when referring to a measurable value such as an amount, a temporal duration, and the like, is meant to encompass variations of ±20% or ±10%, more preferably ±5%, even more preferably ±1%, and still more preferably ±0.1% from the specified value, as such variations are appropriate to perform the disclosed methods.

Embodiments are illustrated, in part, by the following non-limiting methods and examples:

GENERAL METHODS

Mixing Methods

Preparation of formulation may be performed in an inert atmosphere, a reduced humidity atmosphere, or in an open atmosphere.

Method A: All components except crosslinker were combined with stirring (85° C., 18-24 hours), in 1-1.5 eq sacrificial solvent (THF or MEK). The formulation was cooled to RT, and a solution of crosslinker in solvent was added, with a further 15 minutes of stirring, prior to coating.

Method B: a first part was prepared by combining chromophore, PVB, salt and a first portion of the solvent, with stirring. A second part was prepared by combining crosslinker, hardener and a second portion of the solvent. First and second parts were prepared, combined and mixed for 15-24 hours (rotating oven at 80° C.). A third part comprising sacrificial solvent and accelerant was prepared (shaking at RT). Parts 1 and 2 were combined and allowed to cool to RT; part 3 was added, and mixed at RT for ~2 hr before coating.

Method C: a first part was prepared by combining chromophore, a first PVB, salt and a first portion of the solvent in a first vial. A second part was prepared by combining a second PVB, cross-linker, hardener (if used) and a second portion of the solvent in a second vial. First and second parts were mixed gently (rotating oven) at 80° C. overnight (15-24 hours). The first vial was allowed to cool to RT and the accelerant added (a third part) and the vial returned to the rotating oven for a further 2-4 hours. Parts 1 and 2 were combined and returned to 80° C., the hot formulation was transferred to a syringe for coating.

Coating: Coating of substrates may be performed in an inert atmosphere, a reduced humidity atmosphere, or in an open atmosphere. Co-solvent may be removed by evaporation. To coat, a conductive-coated coated substrate (e.g. ITO-PET) was cut to a desired shape, and a coatable formulation comprising a co-solvent was coated (knife drawn) onto the conductive side of a first sheet of ITO-coated PET using ChemInstruments EZ Coater EC-200, with a Byk coating bar. The co-solvent was evaporated using blown air, and a second layer of conductive-coated substrate laminated on top of the coating with the conductive side in contact with the switching material to form a sandwich structure. The film was rested at room temperature to cure. Optionally, the cure may be followed by incubation at 80° C. for about 10 minutes, or overnight. For compositions without a co-solvent, the step of evaporation was omitted. For compositions with a UV-curing crosslinker, the coated formulation was cured by exposure to UV light (395 nm) before applying the second layer of substrate and conductive oxide.

Following coating and lamination, edges of the 'sandwich' may be sonically welded to provide a seal, or sealed with a layer of polyisobutylene (PIB). Electrical contacts may be added for samples or films that are intended for electrofading.

TABLE 1

Characteristics of some PVBs. Initial screening of polymer components included a range of polyols as listed herein. Several PVBs from a variety of suppliers, including Aldrich, Solutia and Kuraray were tested.

| Reference | MW | PVOH content (%) | PVA content (%) |
|---|---|---|---|
| PVB-1 | 18-28k | 18-21 | 1-4 |
| PVB-2 | 37-47k | 18-21 | 1-4 |
| PVB-3 | 50-60k | 18-21 | 1-4 |
| PVB-4 | 95-105k | 18-21 | 0-4 |
| PVB-5 | 50-60k | 12-16 | 1-4 |
| PVB-6 | 250-350k | 12-16 | 6-10 |
| PVB-7 | 50-60k | 24-27 | 1-4 |
| PVB-8 | 170-250k | 17.5-20 | 0-2.5 |
| PVB-9 | 70-100k | 18.5-20.5 | 0-2.5 |
| PVB-10 | 40-70k | 18-20 | 0-2.5 |
| PVB-11 | | 12-14 | 1-4 |

Preparation and lamination of switchable film: Switching material according to formulations disclosed herein were prepared, and optionally combined with co-solvent. This composition was coated on an ITO-coated PET substrate to provide a final thickness of about 1-2 mil, the co-solvent evaporated and laminated with a second ITO-coated PET substrate and allowed to complete curing overnight at 22° C., followed by one hour at 80° C. The 'sandwich' structure was cut to the desired size, sealed and electrical contacts added.

Glass Lamination: Once the switchable film has been made, and busbars and optional electrical connectors attached, this layer may be attached with an adhesive to a sheet of glass, or laminated between two layers of an adhesive resin and that between two sheets of glass. A "sandwich" of glass—adhesive—switchable film—adhesive—glass was placed in a Carver press (Carver Inc. Wabash Ind.) and pressed at ~55-90 psi at 135° C. for 40 minutes, with ramp-up and cool down periods of about 10 minutes.

In another method, the sandwich may be placed in an evacuated bag, sealed to maintain the vacuum, and incubated in an oven with an initial bonding at a temperature of about 70° C.-110° C. An optional, second bonding step may be performed at a temperature of about 120° C.-140° C., with pressure (e.g. about 0.95 to about 1.5 MPa in an autoclave).

The overall thickness of the laminated glass is dependent, in part on the thickness of the various layers, generally an overall thickness of about 6.3 to about 6.6 mm is preferred. Performance of laminated glass or multi-layer compositions as described herein may be tested by conducting studies using standard techniques in the art, for example, measurement of VLT, $LT_A$, color, haze, switching speed, photostability, and/or durability. WO2010/142019 describes methods, equipment and techniques that may be used to assess the performance of optical filters.

Photochemical darkening and fading; electrochemical fading

Laminated glass or multi-layer compositions are exposed to UV light to darken the switching material, resulting in a decrease in the light transmittance of the material in the visible range. An electric charge of about 2 Volts is then applied to the switching material for 3 minutes, causing the switching material to switch to a faded state. In the faded state, more light is permitted to pass through the switching material resulting in an increase in light transmittance in the visible range. VLT or $LT_A$ in both dark and faded states is measured using an Ocean Optics spectrometer, and a contrast ratio may be calculated ($LT_A$ faded state/$LT_A$ dark state).

Photostability: For photostability assessment, samples were prepared in SGC and weathered in a QSUN Xenon Test Chamber (Q-Labs) at 0.68 W/m². Devices were initially darkened on the QSUN for 1 hour and an initial dark state transmission spectrum (darkening performance) obtained using an Ocean Optics spectrometer. Each device was subsequently photo-faded using a low pressure sodium lamp with yellow filter (400-500 nm cutoff), and an initial faded state transmission spectrum obtained (baseline for yellowness index, and for darkening performance). Devices were returned to the QSUN and spectra taken twice weekly until failure. A device was considered 'failed' when a change in Yellowness Index (ΔYI) greater than 15 from baseline and/or a decrease in darkening performance of 20% or greater, relative to baseline was observed.

A sintered glass cell (SGC) is an enclosed glass chamber with first and second electrodes on opposing inner surfaces, the first and second electrodes electrically separated from each other, and individually connected to a power source for application of a voltage to material placed within the assembled chamber. SGC devices are sealed with nitrocellulose and low-melt glass powder by baking at ~500° C. Injection ports facilitate placement of material within the assembled chamber, and may be sealed with a Teflon plug and held in place by a clamp.

Cyclic Voltammetry (CV): CV was conducted using a three-electrode setup with a 2 mm Pt disc working electrode, a Pt wire counter electrode and an Ag/Ag+ reference electrode. The three-electrode setup was placed into the electrolyte and voltammograms were acquired by scanning a potential window from about −1.0 volts to +2.0 volts, with a scan rate of 100 mV/s. Peak potentials were referenced using ferrocene as an internal standard at the end of each experiment. The Pt disc electrode was cleaned between each experiment by polishing with 1 um and 0.5 um diamond paste followed by sonication in distilled water then rinsed with ethanol and air dried. All experiments were performed at ambient temperatures (25° C.). Where CV is used to identify suitable solvents, the electrolytic solution (solvent and electrolyte), should have a background scan without any major redox peaks, <2.5 μA/mm², in a potential window of about −1 to about 1.2 V, vs Ag/Ag+ reference electrode.

EXAMPLE 1

Switchable Formulations—Solvent Selection

The "Alpha 2" class of formulations comprise triglyme as a solvent component, $TBABF_4$ or $TBAPF_6$ as a salt, PMMA or PVB or a combination thereof as rheology modifiers, and 5-10 wt % of chromophore. Selected examples of formulations within the Alpha 2 class are set out in WO2010/142019. The Alpha 2.5 formulation is a viscous, switching material comprising PVB-9 (21.9 wt %), triglyme (67.6 wt %), 0.5 wt % $TBABF_4$ and 10% chromophore. At elevated temperatures and/or pressure, alpha 2 class formulations may decrease in viscosity, and exhibit flow.

Switchable materials that resisted flow at elevated temperatures may be useful for some applications. Alpha 4.x, 5.x and 6.x formulations are crosslinked to increase the resistance to flow under elevated temperature and/or pressure. The "Alpha 4" group of formulations comprise PDMS-g-PEG, PMMA (350 kDa), PEG-DMA (750 Da), PEG-MEMA (475 Da), triglyme, 5-10% chromophore, $TBABF_4$ and Irgacure 819, and are UV cross-linked. The Alpha 4.2 formulation is a UV cross-linked switching material comprising PDMS-g-PEG (1 wt %), PMMA (350 kDa) (7 wt %), PEG-DMA (750 Da) (12.45 wt %), PEG-MEMA (475 Da) (12.45 wt %), triglyme (56 wt %), 10 wt % chromophore, $TBABF_4$ (0.1 wt %) and Irgacure 819 (1 wt %), Briefly, PDMA, salt, triglyme and PMMA are mixed at 80° C. Chromophore was subsequently added and dissolved in the premix with stirring at 80° C., and the mixture cooled to ambient temperature. PEG-DMA and PEG-MEMA were subsequently added with stirring at ambient temperature, with a minimum 1 hour of mixing. Irgacure 819 was added, stirred for 10 minutes at ambient temperature and the formulation coated and cured with UV light (3 min exposure, 35 mm gap; RX StarFire 150×20 mm emitting window; AC395-1.75 W from Phoseon Technologies)

The Alpha 5 group of formulations comprise epoxide-cross-linked PVB in an electrochromic medium, the electrochromic medium comprising a salt and a solvent. The Alpha 5.1 formulation is a switching material comprising S109 (10%), diethyl adipate (DEAd) or dimethyl adipate (DMAd) (77.6%), AMC-2 (0.8%), DER736 (0.8%), MHHPS (0.7%), $TBABF_4$ (0.1%), PVB-9 (1%), PVB-3 (9%). The alpha 5.x series formulations include Texanol as a solvent.

Solvent Selection: A preliminary screen of solvents was conducted by assessing the photostability of a 10% solution of chromophore in the solvent. Solvents that did not demonstrate suitable photostability, were removed from further consideration.

Additional solvents identified as having one or more of a boiling point of about 150° C. or greater, a vapour pressure of about 0.001 mmHg or less at 20° C., a flash point of about 80° C. or greater, a melting point of about 40° C. or less were tested for compatibility with selected formulation components—S109 (10%); $TBABF_4$ (1%); PVB-9 (5%); PMMA 350 kDa (5%); PEG-DMA 750 Da (50%); PEG-MEMA 375 Da (50%); Irgacure 819 (1%); and PDMS-g-PEG (1%). Solubility of formulation components and optical clarity of the resulting solution were the initial criteria assessed. A compatible, or suitable, solvent was one that dissolved all components of at least one of alpha 2, alpha 4 or alpha 5 class formulation, and was optically clear.

Suitable solvents were further assessed for cyclic voltammetry (CV) performance, and photostability (PS) with S109 and S158 chromophores. Solvents demonstrating suitable solubility profiles were further screened using cyclic voltammetry (CV). Solvents demonstrating suitable CV profiles were screened for photostability with and without chromophore. Results of solubility, CV and initial PS screen candidate solvents for use with one or more of alpha 2, alpha 4 or alpha 5 formulations are set out in Table 2.

TABLE 2

Solvent selection - solvents demonstrating alpha 2 (a2), alpha 4 (a4) and alpha 5 (a5) component solubility, suitable CV profile and suitable PS profile for S109 and S158 chromophores.

| Solvent | a2 | a4 | a5 | CV | S109 PS | S158 PS |
|---|---|---|---|---|---|---|
| Triglyme | ✓ | ✓ | ✓ | ✓ | ✓ | ✓ |
| 1-Decanol | ✓ | | ✓ | | | |
| 2-(2-ethylhexyloxy)ethanol (EHE) | ✓ | | ✓ | ✓ | | |
| 2,2,4-trimethyl-1,3-pentanediol monoisobutyrate ("Texanol") | ✓ | | ✓ | ✓ | ✓ | ✓ |
| 2,2,4-trimethyl-1,3-pentanediol dibenzoate | | ✓ | | | | |
| 2-Ethyl-1,3-hexanediol (2E13H) | ✓ | | ✓ | ✓ | | |
| 2-ethylhexyl-(s)-lactate (EHL) | ✓ | | ✓ | ✓ | | |
| 3-(hydroxypolyethyleneoxypropyl)-heptamethyltrisiloxane | ✓ | | ✓ | | | |
| Di(ethylene glycol) dibenzoate | ✓ | ✓ | ✓ | | | |
| Di(propylene glycol) dibenzoate | ✓ | ✓ | ✓ | | | |
| Dibutyl itaconate (BI) | | | ✓ | ✓ | ✓ | ✓ |
| Diethyl adipate (DEAd) | ✓ | ✓ | ✓ | ✓ | ✓ | ✓ |
| Diethyl azelate | ✓ | | ✓ | | | |
| diethyl phthalate | ✓ | ✓ | ✓ | ✓ | | |
| Diethyl succinate | | | ✓ | | | |
| diethylene glycol hexyl ether (DEGHE) | ✓ | | ✓ | ✓ | | |
| diethylene glycol monobutyl ether | ✓ | | ✓ | | | |
| Diethylene glycol monoethyl ether acetate (DEGEEA) | ✓ | ✓ | ✓ | ✓ | ✓ | |
| diethylene glycol n-butyl ether acetate (BEEA) | ✓ | ✓ | ✓ | ✓ | ✓ | ✓ |
| dimethyl adipate (DMAd) | ✓ | ✓ | ✓ | ✓ | ✓ | ✓ |
| dimethyl azelate | ✓ | ✓ | ✓ | | | |
| dimethyl phthalate | ✓ | ✓ | ✓ | | | |
| Dimethyl-2-methyl glutarate | | | ✓ | ✓ | ✓ | ✓ |
| dipropylene glycol | ✓ | | ✓ | | | |
| dipropylene glycol methyl ether acetate | | | ✓ | | | |
| Dipropylene glycol monomethyl ether | ✓ | ✓ | ✓ | | | |
| dipropylene glycol n-butyl ether | | | ✓ | ✓ | ✓ | |
| Dipropylene glycol n-propyl ether | ✓ | | ✓ | | | |
| ethylene glycol phenyl ether (POE) | ✓ | ✓ | ✓ | | | |
| Glyceryl triacetate | | | ✓ | | | |
| N,N-dimethyldecanamide | ✓ | | ✓ | | | |
| poly(ethylene glycol) dibenzoate | ✓ | ✓ | ✓ | | | |
| poly(propylene glycol) dibenzoate | ✓ | ✓ | ✓ | | | |
| propylene carbonate (PC) | | | ✓ | ✓ | | |
| Propylene glycol diacetate (PGDA) | | | ✓ | ✓ | ✓ | ✓ |
| tetraethyl propane-1,1,2,3-tetracarboxylate | | | ✓ | | | |
| tetramethylene sulfone | ✓ | ✓ | ✓ | ✓ | | |

TABLE 2-continued

Solvent selection - solvents demonstrating alpha 2 (a2), alpha
4 (a4) and alpha 5 (a5) component solubility, suitable CV profile
and suitable PS profile for S109 and S158 chromophores.

| Solvent | a 2 | a4 | a5 | CV | S109 PS | S158 PS |
|---|---|---|---|---|---|---|
| Tetramethylene sulfoxide | ✓ | ✓ | ✓ | | | |
| Tri(propylene glycol) butyl ether | ✓ | ✓ | ✓ | | | |
| Tri(propylene glycol) methyl ether | ✓ | | ✓ | | | |
| Tributyrin aka Butanoic acid, 1,2,3-propanetriyl ester | | ✓ | | | | |
| Triethylene glycol di-2-ethyl butyrate (TEG DEB) | ✓ | ✓ | ✓ | ✓ | ✓ | |
| triethylene glycol monobutyl ether | ✓ | ✓ | | | | |
| triethylene glycol monoethyl ether (TEG MEE) | ✓ | ✓ | ✓ | ✓ | | |
| triethylene glycol monomethyl ether (TEG MME) | ✓ | ✓ | ✓ | ✓ | | |
| tripropylene glycol | ✓ | | ✓ | | | |
| Tripropylene glycol n-propyl ether (TPGPE) | ✓ | | ✓ | ✓ | | |

Figure 3:
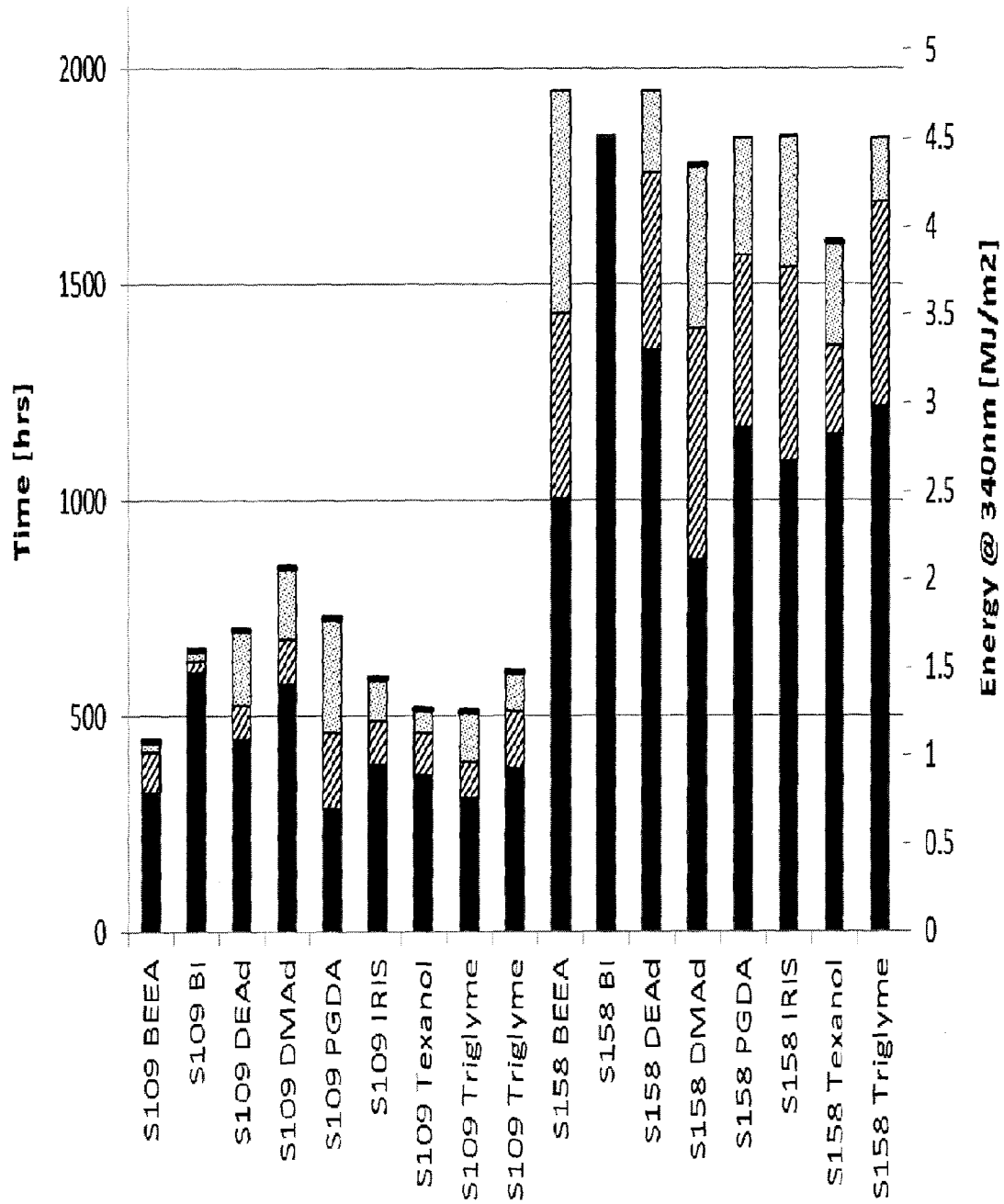
FIG. 3 shows a bar graph illustrating darkening performance of selected solvents with 5% S109 or 5% S158 chromophore in solvent, sealed in an SGC. Experiments were performed in triplicate, and representative devices are shown. Solvents are named along the X axis; time (hours) in a QSUN Xenon Test Chamber providing 0.68 W/m$^2$ of UV light at a wavelength of 340 nm is along the left side Y-axis; cumulative energy exposure (MJ/m$^2$) is along the right side Y-axis. Solid bar—90-100% of baseline dark state; striped bar—85-90% of baseline dark state; dotted bar 80-85% of baseline dark state. Solid black 'cap' at top of bar indicates device attained <80% of baseline dark state (removed from Xenon Test Chamber).
Figure 4:
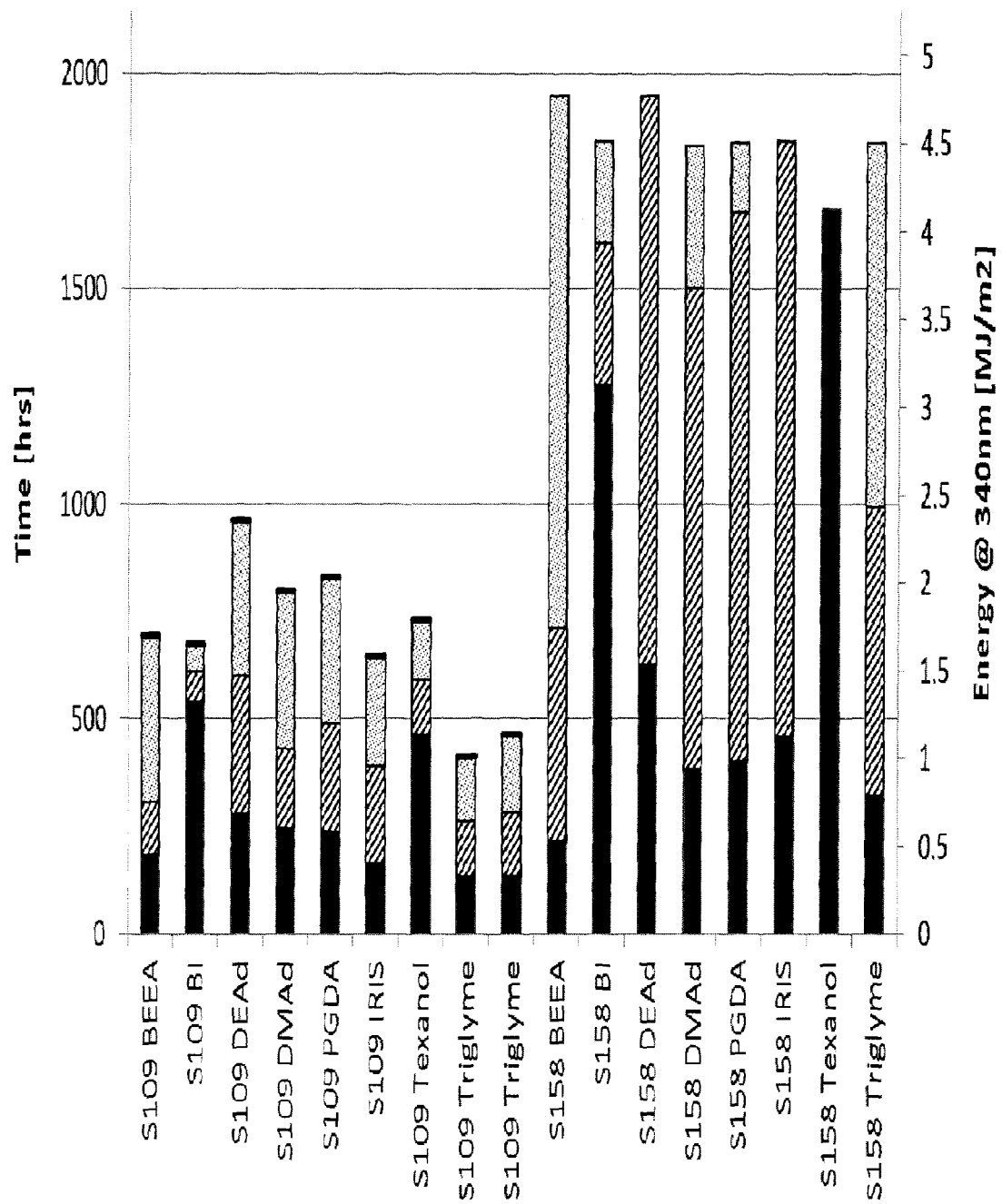
FIG. 4 shows a bar graph illustrating the change in Yellowness Index (delta YI, or ΔYI) for the same samples of FIG. 3. Solid bar—delta YI of 0-5 relative to baseline faded state; striped bar—delta YI of 5-10 relative to baseline faded state; dotted bar delta YI of 10-15 of baseline faded state. Solid black "cap" at top of bar indicates device with delta YI>15.

FIGS. 1 and 2 illustrate the darkening performance and change in Yellowness Index respectively, for all solvents with a suitable CV profile in the presence of S109 (5%). Solvent is indicated along the X axis. An initial baseline of fully darkened and fully faded state was taken as described, and samples were assessed regularly for darkening performance as reaching 90-100% of baseline, 85-90% of baseline, 80-85% of baseline, and fail (reaching less than 80% of baseline); and for change in Yellowness Index (Δ (delta) YI). Samples are indicated as having a ΔYI of 0 to 5 points off baseline, 5-10 points off baseline, 10-15 points off baseline, and fail (beyond 15 points of baseline). The darkening performance and ΔYI of solutions containing S109 and S158 were assessed in a subset of solvents (BEEA, BI, DEAd, DMAd, PGDA, IRIS, Texanol and triglyme) that demonstrated the best darkening performance and ΔYI. Results are shown in FIGS. 3 and 4.

EXAMPLE 2

Aldehyde Crosslinking of Switchable PVB Formulations

Irgacure 819 (used in alpha 4 class formulations) is a photoinitiator for radical polymerization of polymers upon UV exposure (UV cross-linking). Alternate polymer cross-linking methods, and different polymers were investigated. The Alpha 5 class of formulations were developed to crosslink without a radical (UV) cure. Switchable aldehyde-crosslinked formulations were developed, comparing two different acid cures, and inclusion of a 'water scavenger' (triethyl orthoformate). Formulations are recited in Table 3. Formulations were prepared and coated in a reduced humidity and reduced oxygen environment (nitrogen- or argon-filled glove box with less than 100 ppm atmospheric water and less than 100 ppm oxygen).

TABLE 3

Aldehyde crosslinked formulations #1 to #3

| | Formulation #1 | Formulation #2 | Formulation #3 |
|---|---|---|---|
| triglyme | 84.55 | 82.93 | 82.55 |
| PVB-9 | 5 | 4.88 | 5 |
| Terephthalaldehyde | 0.3 | 0.3 | 0.3 |
| HCl | — | 0.1 | 1 |
| p-toluenesulfonic acid | 0.05 | — | 0.05 |
| S109 | 10 | 9.76 | 10 |
| TBABF$_4$ | 0.1 | 0.1 | 0.1 |
| Triethyl orthoformate | — | 1.95 | 2 |

All quantities in wt %.

Components for formulation #1 to #3 (except acid—HCl or pTSA) were combined and mixed at 80° C. for 20 min, and rested overnight (RT). The resulting semi-solid mixture was re-heated to 80° C., and the acid added with stirring, and the formulation injected into a sintered glass cell (SGC) and cured for 24 hours at 80° C.

Following curing, all three formulations were reversibly interconvertible from a light state to a dark state and from a dark state to a light state by exposure to UV light and application of a voltage (~2 volts), respectively.

EXAMPLE 3

Epoxide Crosslinking

Switchable epoxide-crosslinked PVB formulations were developed, using solvents demonstrating an improvement in darkening performance and/or ΔYI, relative to triglyme. Composition of formulations #4 to #10 are provided in Table 4. Mixing and coating was performed as described according to Mixing Method A.

Formulation #4 did not include an accelerant. The film was coated in ambient atmosphere, with the goal of determining if the uncured switching material was hard enough to laminate. Following evaporation of the co-solvent (THF) the formulation oozed from the side of the film when the second layer of substrate was applied.

Formulation #5 was composed, coated, and co-solvent evaporated. The resulting switching material was successfully laminated and was cured as described. The resulting 'sandwich' did not electrofade.

Formulation #6 provided 10% total PVB content after evaporation of co-solvent, and was coatable and laminatable after evaporation of co-solvent, and was cured as described. The resulting 'sandwich' did not electrofade.

Formulation #7, 8, 9 and 10 were coatable, and following evaporation of co-solvent, was laminated and cured as described. The resulting 'sandwich' was successfully electrofaded.

Figure 5:
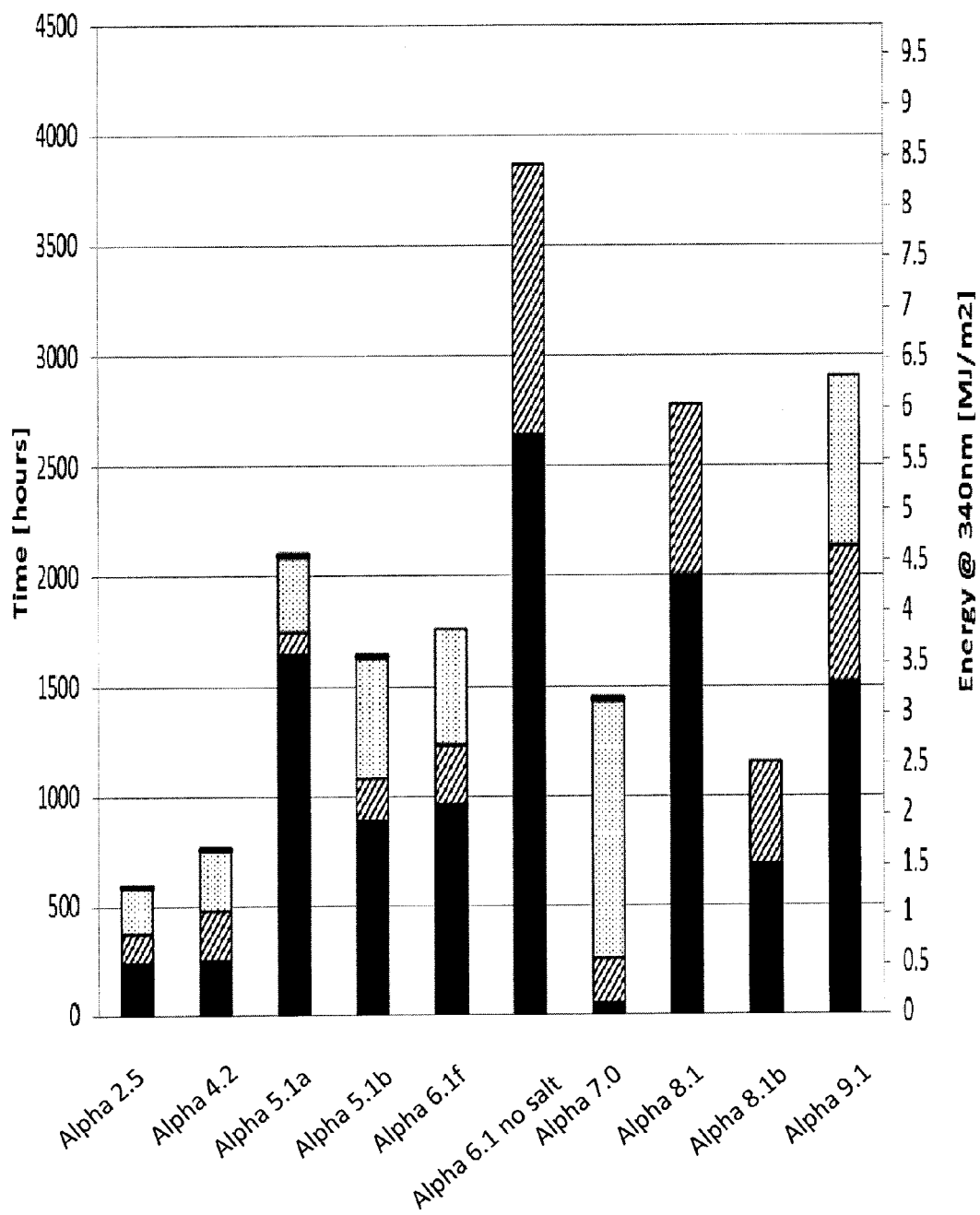
FIG. 5 shows a bar graph illustrating darkening performance of various formulations in a sealed device. Experiments were performed in triplicate, and representative devices are shown. Solvents are named along the X axis; time (hours) in a QSUN Xenon Test Chamber providing 0.68 W/m$^2$ of UV light at a wavelength of 340 nm is along the left side Y-axis; cumulative energy exposure (MJ/m$^2$) is along the right side Y-axis, All formulation percentages are weight %. Solid bar—90-100% of baseline dark state; striped bar—85-90% of baseline dark state; dotted bar 80-85% of baseline dark state. Solid black 'cap' at top of bar indicates device attained <80% of baseline dark state (removed from Xenon Test Chamber). Samples for alpha 6.1f (no salt) 8.1a and 8.1b had not reached a failure point as of the indicated explosures
Figure 6:
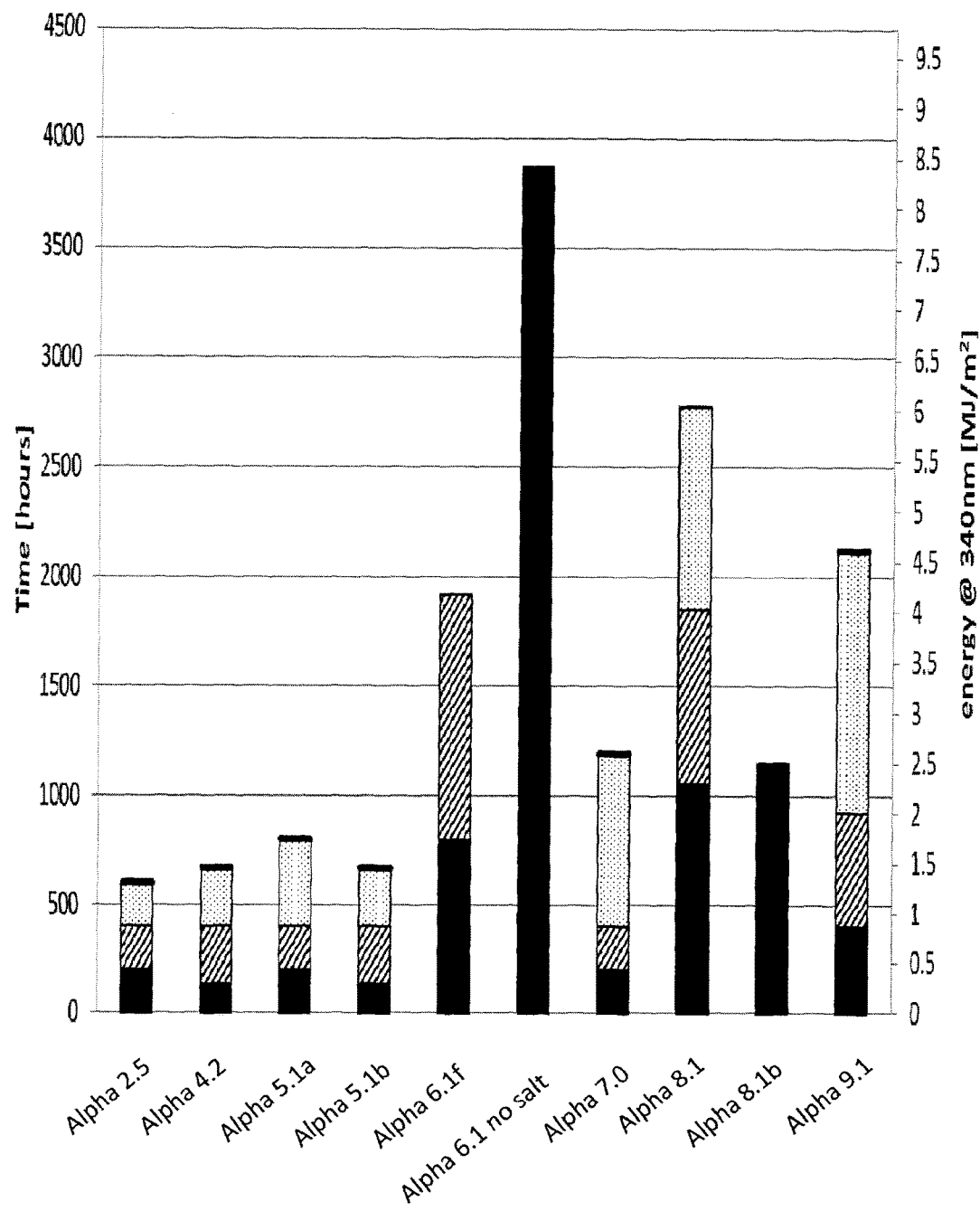
FIG. 6 shows a bar graph illustrating the change in Yellowness Index (delta YI, or ΔYI) for the same samples of FIG. 5. Solid bar—delta YI of 0-5 relative to baseline faded state; striped bar—delta YI of 5-10 relative to baseline faded state; dotted bar delta YI of 10-15 of baseline faded state. Solid black "cap" at top of bar indicates device with delta YI>15.

FIGS. 5 and 6 show a comparison of alpha 2.5, alpha 4.2 formulation, and two alpha 5.1 formulations (formulations #8 and 10) for darkening performance and Δ YI. Alpha 2.5—(Device 3430) S109 10%, TBABF$_4$ 0.5%, PVB-9 21.9%, triglyme 67.6%. Alpha 4.2—(Device 3352) S109 10%, TBABF$_4$ 0.1%, Irgacure 1%, PEG-DMA 12.45%, PMMA 7%, PDMS-g-PEG 1%, PEG-MEMA 12.45%, triglyme 56%. Alpha 5.1a with DEAd—(Device 4409) S109 10%, Diethyl Adipate 77.6%, AMC-2 0.8%, DER736 0.8%, MHHPA 0.7%, TBABF$_4$ 0.1%, PVB-9 1%, PVB-3 9%. Alpha 5.1b with DMAd—(Device 4404) S109 10%, Dimethyl Adipate 77.6%, AMC-2 0.8%, DER736 0.8%, MHHPA 0.7%, TBABF$_4$ 0.1%, PVB-9 1%, PVB-3 9%. Alpha 5.1 formulations demonstrated superior darkening performance relative to alpha 2.5 and 4.2; the experiment was terminated before the alpha 5.1 samples reached failure. Alpha 4.2 appeared to have an overall superior Δ YI performance, however the time to progress beyond a Δ YI of 5 was not improved over either of alpha 5.1 formulations.

Formulation components for Alpha 6.1f, alpha 7.0, alpha 8.1, alpha 8.1b and alpha 9.1 are provide in Tables 8, 9 and 10, and Example 9.

TABLE 4

Formulations #4-#10

| | formulation 4 | | formulation 5 | | formulation 6 | | formulation 7 | | formulation 8 | | formulation 9 | | formulation 10 | |
|---|---|---|---|---|---|---|---|---|---|---|---|---|---|---|
| | Wt % | WWC | Wt % | WWC | Wt % | WWC | Wt % | WWC | Wt % | WWC | Wt % | WWC | Wt % | WWC |
| DEAd | 60.08 | 39.95 | 49.60 | 24.80 | 64.56 | 32.27 | 75.65 | 60.50 | | | | | 77.60 | 51.73 |
| DMAd | | | | | | | | | 77.60 | 51.73 | | | | |
| BEEA | | | | | | | | | | | 77.60 | 51.73 | | |
| S109 | 10.08 | 6.70 | 10.00 | 5.00 | 10.00 | 5.00 | 10.02 | 8.01 | 10.00 | 6.67 | 10.00 | 6.67 | 10.00 | 6.67 |
| PVB-3 | 15.12 | 10.05 | 25.00 | 12.50 | 9.00 | 4.50 | 9.02 | 7.21 | 9.00 | 6.00 | 9.00 | 6.00 | 9.00 | 6.00 |
| PVB-9 | | | | | 1.00 | 0.50 | 1.00 | 0.80 | 1.00 | 0.67 | 1.00 | 0.67 | 1.00 | 0.67 |
| TBABF4 | 0.50 | 0.34 | 0.50 | 0.25 | 0.50 | 0.25 | 0.50 | 0.40 | 0.10 | 0.07 | 0.10 | 0.07 | 0.10 | 0.07 |
| DER 736 | 7.86 | 5.23 | 7.80 | 3.90 | 7.80 | 3.90 | 1.65 | 1.32 | 0.80 | 0.53 | 0.80 | 0.53 | 0.80 | 0.53 |
| MHHPA | 6.35 | 4.22 | 6.30 | 3.15 | 6.30 | 3.15 | 1.35 | 1.08 | 0.70 | 0.47 | 0.70 | 0.47 | 0.70 | 0.47 |
| AMC-2 | | | 0.80 | 0.40 | 0.80 | 0.40 | 0.80 | 0.64 | 0.80 | 0.53 | 0.80 | 0.53 | 0.80 | 0.53 |
| | 100.00 | 66.49 | 100.00 | 50.00 | 100.00 | 50 | 100.00 | 80 | 100.00 | 66.67 | 100.00 | 66.67 | 100.00 | 66.67 |
| THF | — | 33.51 | | | | | | | | | | | | |
| MEK | | | | 50 | | 50 | | 20 | | 33.33 | | 33.33 | | 33.33 |

WWC—wt % with cosolvent

EXAMPLE 4

Epoxide Crosslinking

Texanol had also demonstrated suitable darkening performance and Δ YI in earlier studies. Formulations were mixed and coated as described and cured by incubation at 50° C. overnight (15-18 hr)—specific components are set out in Table 5 (wt %).

TABLE 5

Alpha 5.x formulations

| Component | 5.4 | 5.3 | 5.5a | 5.5b | 5.6 | 5.6a | 5.6b |
|---|---|---|---|---|---|---|---|
| PVB-8 | 8.5 | 8.5 | 8.3 | 8.3 | 7.82 | 7.67 | 7.8 |
| Texanol | 79.1 | 79.1 | 77.4 | 76.3 | 72.88 | 71.53 | 71.8 |
| S109 | 10 | 10 | 10 | 10 | 15 | 15 | 15 |
| DER 736 | 0.8 | 0.8 | 0.8 | 1.2 | 0.8 | 0.8 | 1.2 |
| MHHPA | 0.7 | 0.7 | 0.7 | 1 | 0.7 | 0.7 | 1 |
| AMC2 | 0.8 | 0.8 | 0.8 | 1.2 | 0.8 | 0.8 | 1.2 |
| TBATFSI | — | — | 2 | | 2 | 3.5 | 2 |
| TBABF4 | 0.1 | 0.1 | | 2 | | | |
| Total | 100 | 100 | 100 | 100 | 100 | 100 | 100 |
| MEK | — | 50% wt | | | | | |

EXAMPLE 5

Comparison of Epoxides

A selection of epoxides were tested for effect on cure time and any effect on properties of the resulting film (clarity, flow, etc). A formulation containing 56.09 wt % Texanol, 6.01 wt % PVB-8, 0.51 wt % MHHPA, 0.58 wt % AMC-2, 36.23 wt % MEK and 0.058% epoxy was mixed and coated as described. DER736 was used as a comparison. Cure times are indicated in Table 6.

TABLE 6

Comparative cure times for various epoxies (relative to DER736).

| Epoxy | cure time vs Der 736 |
|---|---|
| DER736 | — |
| 1,4-cyclohexanedimethanol diglycidyl ether | slower |
| 1,4-butanediol diglycidyl ether | same |
| 1,7-octadienediepoxide | same |
| 1,2,5,6-diepoxycyclooctane | same |
| no epoxy | slower |
| ethylene glycol diglycidyl ether | same |
| neopentyl glycol diglycidyl ether | same |
| bisphenol A diglycidyl ether | same |
| tris(4-hydroxyphenyl)methane triglycidyl ether | same |
| resorcinol diglycidyl ether | same |

Time to cure was assessed by a peel test (pulling opposing substrates in opposite directions and observing behaviour of the switchable material)—cohesive failure was scored as a complete cure; uncured or incompletely cured material remained adhered to both substrates and was stretched as they separated. Samples were assessed every 30 minutes over the course of up to 4 hours, or until cure.

EXAMPLE 6

Comparison of Accelerant

A selection of accelerants were tested for effect on cure time and effect on properties of the resulting film (clarity, flow etc). A formulation containing 56.09 wt % Texanol, 6.01 wt % PVB-8, 0.51 wt % MHHPA, 0.58 wt % DER736, 36.23 wt % MEK and 0.058% accelerant was prepared and coated as described. Cure times for formulations with different accelerants are indicated in Table 7, relative to AMC-2. Time to cure was assessed by a peel test of the substrates as described.

TABLE 7

Comparative cure times for various accelerants (relative to AMC-2).

| Accelerant | active metal | cure time |
|---|---|---|
| AMC-2 | Cr | — |
| ATC-2 | Cr | same |
| CXC-1613 | Zn | same |
| TYZOR ZEC | Zr | same |
| Zn octanoate | Zn | same |
| Cr 2-ethylhexanoate in mineral oil | Cr | same |
| AC-8 | unknown | same |

EXAMPLE 7

Isocyanate Crosslinking of Switchable PVB Formulation

Isocyanate crosslinking of PVB was evaluated as an alternative for epoxide systems. Formulations varying switching compound (S109 or S158) and salt were prepared and tested, and films cast and observed for ability and rate of switch between dark and faded states. Curing of the system was done at room temperature. Table 8 sets out examples of isocyanate cure formulations.

A co-solvent free formulation may be mixed in two parts (separating the isocyanate and accelerant).

EXAMPLE 8

Combined Solvent Formulations

Inclusion of a second solvent to increase the switching speed was investigated. Combining Texanol (dielectric constant $\varepsilon \approx 2$) with a second solvent with a high dielectric constant may promote more efficient disassociation of the salt, thereby increasing the rate of electrochemical oxidation of the ring-closed hybrid P/E compound resulting in conversion to the a ring-opened state. 1,2-Butylene carbonate (BC) or δ-valerolactone (VL) ($\varepsilon > 30$) were incorporated in the solvent portion of an alpha 6.2 formulation in a 9:1 (w/w) Texanol: BC or 9:1 (w/w) Texanol: VL mixtures (alpha 6.2) and cast into films as described. These mixed solvent films demonstrated up to 50% decrease in $LT_A$ half-life (decreased photostability), compared to alpha 6.x films using only Texanol (alpha 6.1 g).

Alpha 6.2 included S109 (15 wt %), Zn Octoate (0.01 wt %), Desmodur N3600 (0.2 wt %), TBATFSI (2 wt %), PVB-8 (6 wt %), BC ("alpha 6.2BC") or VL ("alpha 6.2VL") (7.68 wt %), Texanol 69.11 wt %). Alpha 7.0 included S109 (15 wt %), AMC-2 (0.8 wt %), DER 736 (0.8 wt %), MHHPA (0.7 wt %), TBA TFSI (2 wt %), PVB-8 (7.82 wt) %, 1,2-Butylene carbonate (7.29 wt %), Texanol (65.59 wt %). FIGS. 5 and 6 show the darkening performance and change in yellowness index, relative to other formulations.

A comparison of the electrofading kinetics of various films including alpha 6.2 with BC or VL is provided in Table14. A benefit in electrofading kinetics is observed with inclusion of a solvent portion component with a higher dielectric constant. In subsequent studies, VL was shown to polymerize to a solid when heated with a catalyst (85° C. with mixing; 0.2 wt % Zn Octoate, 99.8 wt % VL). In contrast, BC (99.8 wt % BC, 0.2 wt % Zn Octoate) did not change in viscosity after 4 days of mixing.

EXAMPLE 9

Alpha 8.x and Alpha 9.x Formulations

Texanol is a mixture of isomers of 2,2,4-trimethyl-1,3-pentanediol, one of which is a primary alcohol. Alpha 8 and 9 formulations were prepared to demonstrate solvent and polymer combinations without Texanol.

TABLE 8

Alpha 6.x formulations. All quantities are wt %.

| | 6.0 | 6.0a | 6.0b | 6.0c | 6.1 | 6.1a | 6.1b | 6.1c | 6.1d | 6.1e | 6.1f | 6.1g |
|---|---|---|---|---|---|---|---|---|---|---|---|---|
| PVB-8 | 7 | 7 | 7 | 7 | 7 | 7 | 7 | 6.43 | 7 | 7 | 6 | 6 |
| Texanol | 80.79 | 80.79 | 80.79 | 80.79 | 75.19 | 75.19 | 73.69 | 74.26 | 75.79 | 74.29 | 76.79 | 76.79 |
| S109 | 10 | 10 | | | 15 | 15 | 15 | 15 | 15 | 15 | | 15 |
| S158 | | | 10 | 10 | | | | | | | 15 | |
| Desmodur N3600 | 0.2 | 0.2 | 0.2 | 0.2 | 0.8 | 0.8 | 0.8 | 0.8 | 0.2 | 0.2 | 0.2 | 0.2 |
| Zinc Octanoate | 0.01 | 0.01 | 0.01 | 0.01 | 0.01 | 0.01 | 0.01 | 0.01 | 0.01 | 0.01 | 0.01 | 0.01 |
| TBATFSI | | 2 | | 2 | 2 | 2 | | 3.5 | 3.5 | 2 | 3.5 | 2 | 2 |
| TBABF4 | 2 | | 2 | | | | | | | | | |
| Total | 100 | 100 | 100 | 100 | 100 | 100 | 100 | 100 | 100 | 100 | 100 | 100 |

Alpha 8 formulations were successfully cured, and were laminatable at elevated temperature and/or pressure with the exception of formulation 8.4d4 (Tables 10, 14). Specific amendments to the formulations were made to test, or demonstrate different characteristics of the films or individual components. For example, HMDI was substituted with Desmodur N3600 (an HMDI trimer) PVB-8 was substituted with PVB-4 (to use a more soluble polymer); PVB-5 and PVB-4 were replaced with PVB-6 (to use a higher MW polymer); salts with TFSI and BF4 anions were compared for effect on photostability and electrofading kinetics; cross-linking agent was reduced to improve kinetics.

Alpha 9 formulations (Table 9) were successfully cured and were laminatable at elevated temperature and/or pressure. Alpha 8 formulations (Table 10) were successfully cured; in an inert atmosphere (N2 glove box) or under normal atmosphere with reduced humidity.

TABLE 9

Alpha 9 formulations. All quantities in wt %. 1-1.5 eq THF was used as co-solvent for all formulations. GPOx—glycerol propoxylate-block-ethoxylate (Mn ~4000); SOLEF - SOLEF 21508 (Solvay). Alpha 9.1, 9.1a and 9.1c were shown to be laminatable, representing both ranges of crosslinker used in the alpha 9 formulations.

|  | 9.1 | 9.1a | 9.1b | 9.1c | 9.1d |
|---|---|---|---|---|---|
| S109 |  |  |  |  |  |
| S158 | 10 | 10 | 10 | 10 | 10 |
| ZnOct | 0.1 | 0.1 | 0.01 | 0.01 | 0.1 |
| N3600 | 0.62 | 0.47 | 0.62 | 0.47 | 0.62 |
| TBATFSI | 1 | 1 | 1 | 1 |  |
| TBABF4 |  |  |  |  | 1 |
| SOLEF | 10 | 10 | 10 | 10 | 10 |
| GPOx | 5 | 5 | 5 | 5 | 5 |
| BC | 7.33 | 7.34 | 7.34 | 7.35 | 7.33 |
| RI | 65.95 | 66.09 | 66.03 | 66.17 | 65.95 |

TABLE 10

Alpha 8 formulations. All quantities in wt %. 1-1.5 eq THF was used as co-solvent for all formulations. All resulting films darkened with exposure to UV light, and faded with application of 1.8-2.5 V. Relative performance is shown - electrofading kinetics (1 = Poor, 2 = Fair, 3 = Good) and lamination ("Lam") - pass/fail. ND no data.

|  | 8.1 | 8.1a | 8.1b | 8.2 | 8.2a | 8.2b | 8.3 | 8.3a | 8.3b | 8.3c |
|---|---|---|---|---|---|---|---|---|---|---|
| S109 | 15 |  |  | 15 |  |  |  |  | 15 |  |
| S158 |  | 15 | 15 |  | 15 | 15 | 15 | 15 |  |  |
| S161 |  |  |  |  |  |  |  |  |  | 15 |
| ZnOct | 0.01 | 0.01 | 0.01 | 0.01 | 0.01 | 0.01 | 0.01 | 0.01 | 0.01 | 0.01 |
| N3600 |  |  | 0.08 |  |  | 0.08 | 0.28 | 0.28 | 0.28 | 0.28 |
| HMDI | 3.75 | 0.37 |  | 3.75 | 0.37 |  |  |  |  |  |
| TBA-TFSI | 1 | 1 | 1 | 1 | 1 | 1 | 1 |  | 1 | 1 |
| TBA-BF4 |  |  |  |  |  |  |  | 1 |  |  |
| PVB-8 | 3 |  |  | 3 |  | 10 |  |  |  |  |
| PVB-5 | 10 | 10 | 10 | 10 | 10 | 3 |  |  |  |  |
| PVB-4 |  | 3 | 3 |  | 3 |  |  |  |  |  |
| PVB-6 |  |  |  |  |  |  | 10 | 10 | 10 | 10 |
| BC | 6.7 | 7 | 7 | 6.7 | 7 | 7 | 7.37 | 7.37 | 7.37 | 7.37 |
| RI | 60.54 | 63.62 | 63.91 |  |  |  | 66.34 | 66.34 | 66.34 | 66.34 |
| DES |  |  |  | 60.54 | 63.62 | 63.91 |  |  |  |  |
| Kinetics |  |  |  |  |  |  |  |  |  | ND |
| Lam | Pass | Pass | Pass | Pass | Pass | Pass | Pass | Pass | Pass | ND |

|  | 8.3z | 8.4 | 8.4a | 8.4c | 8.4d | 8.4e | 8.4f | 8.4g | 8.4h | 8.4j |
|---|---|---|---|---|---|---|---|---|---|---|
| S109 |  |  |  |  | 15 |  | 15 |  |  |  |
| S158 | 15.2 | 15 | 12 | 15 |  | 12 |  | 12 | 15 | 15 |
| S161 |  |  |  |  |  |  |  |  |  |  |
| ZnOct | 0.01 | 0.01 | 0.01 | 0.01 | 0.01 | 0.02 | 0.02 | 0.02 | 0.02 | 0.01 |
| N3600 | 0.28 | 0.21 | 0.21 | 0.21 | 0.21 | 0.42 | 0.42 | 0.21 | 0.21 | 0.21 |
| HMDI |  |  |  |  |  |  |  |  |  |  |
| TBA-TFSI | 1.02 | 1 | 1 | 1 | 1 | 1 | 1 | 1 | 1 | 1 |
| TBA-BF4 |  |  |  |  |  |  |  |  |  |  |
| PVB-8 |  | 5 | 5 | 5 | 5 | 5 | 5 | 5 | 5 | 5 |
| PVB-5 |  |  |  |  |  |  |  |  |  |  |
| PVB-4 |  |  |  |  |  |  |  |  |  |  |
| PVB-6 | 10.1 | 7 | 7 | 7 | 7 | 7 | 7 | 7 | 7 | 10 |
| BC | 7.33 | 7.18 | 7.48 |  | 7.48 | 7.46 | 7.46 | 7.48 |  |  |
| RI | 65.97 | 64.6 | 67.3 | 71.78 | 64.3 | 67.1 | 67.1 | 67.29 | 71.77 | 68.78 |
| DES |  |  |  |  |  |  |  |  |  |  |
| Kinetics | ND | 3 | 3 | 3 | 3 | 1 | 1 | 3 | 3 | 1 |
| Lam | Pass | Pass | Pass | Pass | Pass | Pass | Pass | Pass | Pass | ND |

FIGS. 5 and 6 show a comparison of representative alpha 2.5, alpha 4.2, alpha 5.1, alpha 6, alpha 7, alpha 8 and alpha 9 formulations for darkening performance and Δ YI. Chemically crosslinked formulations (alpha 5.1, 5.1b, 6.1f, 7.0, 8.1, 8.1b and 9.1) demonstrated superior darkening performance relative to alpha 2.5 and 4.2. Alpha 4.2 appeared to have an overall superior Δ YI performance, however the time to progress beyond a Δ YI of 5 was not improved over either of alpha 5.1 formulations. A decrease in photostability was not observed in alpha 8 and 9 formulations, which omitted Texanol. Removal of TBATFSI salt from Alpha 6.1f resulted in a formulation with improved darkening performance, but renders the formulation not electrochemically switchable. Alpha 8.1, containing Rhodiasolv IRIS and TBATFSI salt exhibits improved darkening performance over Alpha 6.1f and is electrochemically switchable.

EXAMPLE 10

PVB Combinations in Switchable Films

Stock solutions of 15 wt % PVB-6 and 10 wt % PVB-8 in 9:1 RI:BC, with 1 eq THF were prepared and combined in various ratios (with additional 9:1 RI/BC solvent portion as needed) to provide a set of PVB/plasticizer mixtures for test films with 0 or 5-15 wt % PVB-6 and 0-6 wt % PVB-8. Mixtures were coated as described, rested overnight and subjected to a peel test for cohesive/adhesive and firmness (deformation under manual pressure—fingertip or pen). Results are set out in Table 11. Combinations of polymer that demonstrate cohesive failure, and score as 'firm' were further tested in alpha formulations with crosslinking (Table 12).

TABLE 11 plasticizer/polymer mixtures and film texture.

| sample | wt % PVB-6 | wt % PVB-8 | Failure type; firmness |
|---|---|---|---|
| 1 | 0 | 5 | Adhesive |
| 2 | 0 | 4 | Adhesive |
| 3 | 0 | 3 | Adhesive |
| 4 | 0 | 2 | (not prepared) |
| 5 | 10 | 3 | Cohesive; soft |
| 6 | 10 | 2 | Cohesive; soft |
| 7 | 10 | 1 | Cohesive; soft |
| 8 | 9 | 4 | Adhesive |
| 9 | 9 | 3 | Cohesive; soft |
| 10 | 9 | 2 | Cohesive; firm |
| 11 | 8 | 4 | Cohesive; firm |
| 12 | 8 | 3 | Cohesive; firm |
| 13 | 8 | 2 | Cohesive; soft |
| 14 | 7 | 5 | Cohesive; firm |
| 15 | 7 | 4 | Cohesive; soft |
| 16 | 7 | 3 | Cohesive; soft |
| 17 | 6 | 6 | Cohesive; firm |
| 18 | 6 | 5 | Adhesive |
| 19 | 5 | 6 | Adhesive |
| 20 | 5 | 5 | Adhesive |
| 21 | 15 | 0 | Cohesive; firm |

TABLE 12

Post-cure performance. Formulations included 15 wt % chromophore (S109), 1 wt % salt (TBATFSI), 0.01 wt % accelerant (ZnOct), 0.28 wt % N3600, and 68-71 wt % 9:1 RI/BC, in 1 eq. THF co-solvent.

| Sample | wt % PVB-6 | wt % PVB-8 | Firmness | Flow after cure |
|---|---|---|---|---|
| 22 | 9 | 3 | Soft | N |
| 23 | 8 | 4 | Firm | Slight |
| 24 | 9 | 2 | Soft | Slight |
| 25 | 8 | 3 | Soft | N |
| 26 | 7 | 5 | Firm | N |
| 27 | 6 | 6 | Firm | N |
| 28 | 15 | 0 | Firm | N |

Films that appeared firm and didn't show flow during post-cure were tested for electrofading kinetics. Sample 26 was significantly faster than samples 27 or 28.

EXAMPLE 11

Deformation Resistance of Switchable Films

Films were prepared, and placed in a Carver press with a rubber disc centred on the platen. The disk was compressed against the film for 10 seconds (at room temperature), and the film inspected for deformation. A film was considered deformed if it demonstrated denting, extrusion of film components, or a partial or full compression ring (switching material squeezed out where the rubber disc was pressed. An alpha 8.4a film exhibited deformation with application of 1000 lb force. An alpha 6 film exhibited no deformation up to 1600 lb of force; application of 1800 lb of force caused a ring-shaped deformation with material forced outwards, creating a darker ring (film components pushed out)

EXAMPLE 12

Electrofading Kinetics

Inclusion of BC in the solvent portion was found to decrease the fade time of films. BC was initially excluded as a solvent candidate as it did not solubilize the chromophore. Surprisingly, inclusion of BC in the solvent portion improved the fading times of films, particularly for electrolyte comprising RI and BF4 anion. Fade times for the indicated formulations are provided in Table 13. With TFSI as the anion, electrofading kinetics are not greatly improved with inclusion of BC in the electrolyte. Where the anion is BF4, inclusion of BC does improve the electrofading time of the film. Inclusion of BC also improved electrofading kinetics when combined with Texanol, for either of BF4 or TFSI anions. Haze was also measured for the indicated films, using a BYK Hazemeter.

TABLE 13

Thickness, and electrofading time of switchable films. 90-10% PSS - time in seconds to fade film from 90% of PSS maximum absorbance to 10% of PSS maximum absorbance, with application of 1.8 V

| Formulation | Thickness (mil) | 90-10% PSS |
|---|---|---|
| 6.1f | 1.4 | 25 |
| 6.2BC | 1.6 | 14 |
| 6.2VL | 1.2 | 15 |
| 5.5a | 1.1 | 122 |

TABLE 13-continued

Thickness, and electrofading time of switchable films. 90-10% PSS - time in seconds to fade film from 90% of PSS maximum absorbance to 10% of PSS maximum absorbance, with application of 1.8 V

| Formulation | Thickness (mil) | 90-10% PSS |
|---|---|---|
| 7.0 | 1.2 | 77 |
| 8.4a | 1.2 | 15.9 |
| 8.4c | 1.15 | 18.5 |
| 8.4c1 | 1.1 | 19.5 |
| 8.3a | 1.65 | 41.0 |
| 8.3a* | 1.65 | 46.6 |

*70.03 wt % RI and 3.68 wt % BC to provide a 19:1 wt ratio

EXAMPLE 13

Degree of Crosslinking and Effect on Lamination and Electrofading Kinetics

Formulation alpha 8.4d was shown to have good electrofading kinetics, and was laminatable (Table 10). Reducing the quantity of crosslinker improved electrofading kinetics, but the resulting films were only laminatable above 0.07 wt % crosslinker (Table 14). Without wishing to be bound by theory, reducing the crosslinking may provide a more open film matrix, facilitating movement of chromophore and ions therein, but with a corresponding reduction in physical strength.

TABLE 14

Alpha 8.4d base formula, with varying crosslinker (N3600) quantities, and response of electrofading kinetics (1 = Poor, 2 = Fair, 3 = Good) and lamination ("Lam") - pass/fail.

| | 8.4d1 | 8.4d2 | 8.4d3 | 8.4d4 | 8.4d5 | 8.4d6 |
|---|---|---|---|---|---|---|
| S109 | 15 | 15 | 15 | 15 | 15 | 15 |
| ZnOct | 0.01 | 0.01 | 0.01 | 0.01 | 0.01 | 0.01 |
| N3600 | 0.28 | 0.21 | 0.14 | 0.07 | 0.25 | 0.23 |
| TBATFSI | 1 | 1 | 1 | 1 | 1 | 1 |
| PVB-8 | 5 | 5 | 5 | 5 | 5 | 5 |
| PVB-6 | 7 | 7 | 7 | 7 | 7 | 7 |
| BC | 7.171 | 7.178 | 7.185 | 7.192 | 7.174 | 7.176 |
| RI | 64.539 | 64.602 | 64.665 | 64.728 | 64.566 | 64.584 |
| Kinetics | 1 | 3 | 3 | 3 | 2 | 3 |
| Lam. | Pass | Pass | Pass | Fail | ND | ND |

EXAMPLE 14

PVB Loading and Effect on Electrofading Kinetics and Haze

The loading of PVB-6 in the formulation was increased from 7% (8.4c) to 10% (8.4j) to increase the viscosity of the switching material in the uncured state to allow the layer of switching material to pass through a roller nip in a lamination unit of a roll-to-roll coating machine without altering film thickness due to the nip pressure. Surprisingly, the haze and electrofading kinetics were not negatively impacted by the increased PVB content and decreased solvent content. As electrofading may be rate-limited by diffusion of molecules in the switching material, increasing the polymer content, decreasing the solvent content or increasing the degree of crosslinking (increasing the amount of crosslinking agent), may result in a switching material where a slower chromophore diffusion rate and therefore slower electrofading kinetics may be expected.

TABLE 15

Electrofading times and haze values for films of varying PVB-6 content and film thickness.

| Formulation | Thickness (mil) | Electrofading Times for 90-10% PSS (sec) | Haze (%) |
|---|---|---|---|
| 8.4c | 1.2 | 19 | 1.68 |
| 8.4c | 1.0 | 19 | 1.82 |
| 8.4j | 1.0 | 20 | 0.94 |
| 8.4j | 1.1 | 22 | 1.56 |
| 8.4j | 1.2 | 22 | 1.88 |

Other Embodiments

It is contemplated that any embodiment discussed in this specification can be implemented or combined with respect to any other embodiment, method, composition or aspect, and vice versa.

The present invention has been described with regard to one or more embodiments. However, it will be apparent to persons skilled in the art that a number of variations and modifications can be made without departing from the scope of the invention as defined in the claims. Such modifications include the substitution of known equivalents for any aspect of the invention in order to achieve the same result in substantially the same way. Numeric ranges are inclusive of the numbers defining the range. In the specification, the word "comprising" is used as an open-ended term, substantially equivalent to the phrase "including, but not limited to," and the word "comprises" has a corresponding meaning. As used herein, the singular forms "a", "an" and "the" include plural referents unless the context clearly dictates otherwise. Citation of references herein shall not be construed as an admission that such references are prior art, nor as any admission as to the contents or date of the references. All publications are incorporated herein by reference as if each individual publication was specifically and individually indicated to be incorporated by reference herein and as though fully set forth herein. The invention includes all embodiments and variations substantially as hereinbefore described and with reference to the examples and drawings.

Unless defined otherwise, all technical and scientific terms used herein have the same meaning as is commonly understood by one of ordinary skill in the art to which this invention belongs.

What is claimed is:

1. A switching material comprising:
   a. one or more than one polymers, wherein the one or more than one polymers are chemically crosslinked with a crosslinking agent comprising about 0.01 wt. % to about 1 wt. % of the switching material;
   b. an electrolyte comprising;
      i. a salt; and
      ii. a solvent portion comprising one or more solvents;
   c. one or more compounds having electrochromic and photochromic properties dispersed homogeneously through the electrolyte; and
   wherein the switching material is transitionable from a light state to a dark state on exposure to UV light and from a dark state to a light state with application of an electric voltage.

2. The switching material according to claim 1 comprising, on a weight basis:
   a. about 2 wt % to about 15 wt % polymer;
   b. about 0.1 wt % to about 5 wt % salt;
   c. about 50 wt % to about 90 wt % solvent portion;

d. about 2% to about 15 wt % of a compound having electrochromic and photochromic properties.

3. The switching material of claim 1 wherein the one or more than one polymers is a polyol or is a polyvinyl acetal, or is a polyvinyl butyral.

4. The switching material of claim 3 wherein the one or more polymers is a polyvinyl butyral having one or more of: a MW of from about 170 to about 250 k, a polyvinyl alcohol group content of from about 18% to about 21%, a polyvinyl acetate content of from about 0 to about 2.5%.

5. The switching material of claim 3 wherein the polyvinyl butyral having one or more of: a polyvinyl alcohol group content of from about 12% to about 16%, or a polyvinyl acetate content of from about 1% to about 4%.

6. The switching material of claim 1 wherein the salt comprises a TFSI or $BF_4$ anion.

7. The switching material of claim 1 wherein the salt comprises an organic cation.

8. The switching material of claim 1 wherein the organic cation is a tetraalkyl ammonium or a tetraalkylphosphonium cation, and wherein alkyl includes a group of from 1 to 10 carbons.

9. The switching material of claim 2 comprising about 70 wt % to about 90 wt % the solvent portion.

10. The switching material of claim 1 wherein the electrolyte has a potential range of from about −1.0V to about +1.5 V compared to an Ag/AgCl reference electrode.

11. The switching material of claim 1 wherein the solvent has one or more of the following:
   a. a boiling point of about 150° C. or greater;
   b. a vapour pressure of about 0.001 mmHg or less at 20° C.;
   c. a Yellowness Index (YI) of about 6 or less;
   d. a flash point of about 80° C. or greater; and
   e. a melting point of about 40° C. or less.

12. The switching material of claim 1 wherein the solvent, in combination with a chromophore, has a change in Yellowness Index of about 6 or less after 250 hours of weathering.

13. The switching material of claim 1 wherein the solvent portion comprises one or more than one of dimethyl 2-methylglutarate, 1,2-butylene carbonate, 2,2,4-trimethyl-1,3-pentanediol monoisobutyrate, diethyl succinate, diethyl adipate, dimethyl adipate.

14. The switching material of claim 1 wherein the solvent portion comprises dimethyl 2-methylglutarate and 1,2-butylene carbonate.

15. The switching material of claim 1 wherein the solvent portion comprises dimethyl 2-methylglutarate and 1,2-butylene carbonate in a 5:1, 9:1 or 19:1 ratio.

16. The switching material of claim 1 wherein the crosslinking agent comprises one or more isocyanate groups.

17. The switching material of claim 1 wherein the one or more compounds having electrochromic and photochromic properties is a diarylethene.

18. A switchable film comprising:
   a. a first and optionally a second substantially transparent substrate;
   b. a first and a second electrode disposed on the surface of at least one of the substrates; and
   c. a switching material according to claim 1 disposed between the first and the optional second substrates and in contact with the first and the second electrodes.

19. A laminated glass comprising the switchable film of claim 18.

20. The switching material of claim 1, wherein the cross-linking agent comprises about 0.02 wt. % to about 0.4 wt. % of the switching material.

* * * * *